United States Patent [19]

Duncan et al.

[11] Patent Number: 5,953,538
[45] Date of Patent: Sep. 14, 1999

[54] METHOD AND APPARATUS PROVIDING DMA TRANSFERS BETWEEN DEVICES COUPLED TO DIFFERENT HOST BUS BRIDGES

[75] Inventors: Samuel Hammond Duncan, Arlington, Mass.; Craig Durand Keefer, Nashua, N.H.; Thomas Adam McLaughlin, Worcester; Paul Michael Guglielmi, Westboro, both of Mass.

[73] Assignee: Digital Equipment Corporation, Houston, Tex.

[21] Appl. No.: 08/748,145

[22] Filed: Nov. 12, 1996

[51] Int. Cl.⁶ .............................. G06F 12/00; G06F 13/00
[52] U.S. Cl. ........................ 395/842; 395/308; 395/309; 395/847; 395/848; 395/281; 395/856; 395/859
[58] Field of Search ..................................... 395/306–309, 395/842, 847, 848, 281–283, 856–859, 284, 287

[56] References Cited

U.S. PATENT DOCUMENTS

| | | | |
|---|---|---|---|
| 5,379,378 | 1/1995 | Peters et al. | 395/309 |
| 5,619,726 | 4/1997 | Seconi et al. | 395/842 |
| 5,632,021 | 5/1997 | Jennings et al. | 395/309 |
| 5,671,371 | 9/1997 | Kondo et al. | 395/306 |
| 5,673,399 | 9/1997 | Guthrie et al. | 395/308 |
| 5,694,556 | 12/1997 | Neal et al. | 395/308 |
| 5,717,876 | 2/1998 | Robertson | 395/309 |
| 5,754,802 | 5/1998 | Okazawa et al. | 395/309 |
| 5,778,197 | 7/1998 | Dunham | 395/284 |

*Primary Examiner*—Ayaz R. Sheikh
*Assistant Examiner*—Raymond N. Phan
*Attorney, Agent, or Firm*—Hamilton, Brook, Smith & Reynolds, P.C.

[57] ABSTRACT

A multiprocessor having improved bus efficiency is shown to include a number of processing units and a memory coupled to a system bus. Also coupled to the system bus are at least one I/O bridge systems. A method for improving partial cache line writes from I/O devices to the central processing units incorporates cache coherency protocol and an enhanced invalidation scheme to ensure atomicity which minimizing the bus utilization. In addition, a method for allowing peer-to-peer communication between I/O devices coupled to the system bus via different I/O bridges includes a command and address space configuration that allows for communication without the involvement of any central processing device. Interrupt performance is improved through the storage of an interrupt data structure in main memory. The I/O bridges maintain the data structure, and when the CPU is available the interrupts can be accessed by a fast memory read; thereby reducing the requirement of I/O reads for interrupt handling.

15 Claims, 16 Drawing Sheets

METHOD AND APPARATUS PROVIDING DMA TRANSFERS BETWEEN DEVICES COUPLED TO DIFFERENT HOST BUS BRIDGES

FIELD OF THE INVENTION

This invention relates generally to computer systems and more specifically to a method for improving the performance of external device access.

BACKGROUND OF THE INVENTION

As it is known in the art, multi-processor computer systems are designed to accommodate a number of central processing units, coupled via a common system bus or switch to a memory and a number of external Input/Output devices. The purpose of providing multiple central processing units is to increase the performance of operations by sharing tasks between the processors. Such an arrangement allows the computer to simultaneously support a number of different applications while supporting I/O devices that are communicating over a network and displaying images on attached display devices.

To enhance performance, all of the devices coupled to the bus must communicate efficiently. Idle cycles on the system bus represent time periods in which an application is not being supported, and therefore represent reduced performance.

A number of situations arise in multi-processor computer system design in which the bus, although not idle, is not being used efficiently by the processors coupled to the bus. Some of these situations arise due to the differing nature of the devices that are coupled to the bus. For example, central processing units typically include cache logic for temporary storage of data from the memory. A coherency protocol is implemented to ensure that each central processor unit only retrieves the most up to date version of data from the cache. Therefore, central processing units are commonly referred to as 'cacheable' devices.

However, external Input/Output (I/O) devices are non-cacheable devices. They typically do not implement the same cache coherency protocol that is used by the CPUs, although measures must also be taken to ensure that they only retrieve valid data for their operations. Typically I/O devices retrieve data from memory, or a cacheable device, via a Direct Memory Access (DMA) operation, in which data is retrieved in a large block. Typically I/O devices also store data to memory via DMA; when the block of data to be stored is less than a cache block the bridge in the coherent domain reads the block and modifies portions of the data, then writes it back to memory via a DMA as a large block. One mechanism used to ensure coherency is to place a 'lock' on the data block that is used by the I/O device. When a lock is placed on a data block, other cacheable devices in the system do not have access to that data block for the duration of the lock period. If the I/O device is only updating a portion of the block, then restricting the other cacheable devices from using that block results in unnecessary delay that reduces performance. Thus it would be desirable to provide a method for allowing communication between CPUs and I/O devices at increased performance levels.

Similarly, situations may arise in which one I/O device seeks to communicate with other I/O devices coupled to the system. For example, a graphics device or a network device may require data that is stored on a disk. If that device is coupled to the same I/O bus as the original device, then the transfer may be performed by straightforward transfer between the devices over the I/O bus.

However, typically in large multi-processor systems, there may be more than one I/O bus coupled to the system to accommodate more I/O devices. When an I/O device wants to communicate with an I/O device on another bus it must be accomplished via a system bus transfer. Typically, in such a situation, the I/O device issues a DMA transaction to the system, which stores the data in system memory temporarily. Then one of the CPUs issues an I/O write to transfer the contents of the system memory to the I/O device on the second I/O bus. Such an arrangement utilizes system bus bandwidth and CPU compute cycles in an undesirable manner.

A further performance problem arises as a result of system interrupts. Interrupts are a mechanism that are used by the system for indicating to the CPU that an event has occurred that requires attention or repair. Typically, interrupts are used for indicating to the CPU that a transaction has completed, that a service has been requested or, on rare occasion, for a hard or soft error at the I/O device. In addition, interrupts can be used to mark an occurrence of an event, such as the end of a time interval. When the interrupt event occurs, an interrupt signal is forwarded to the CPU. At the end of an instruction sequence, if the interrupt signal is asserted the CPU will halt execution of further instructions and service the interrupt.

Usually there are a number of interrupt event conditions, and each of the conditions is saved as one bit of an interrupt vector that is stored in an interrupt register. The occurrence of an interrupt event causes a signal to be asserted, and the signal assertion is logged in the appropriate location of the interrupt register. The interrupt signal is monitored by the CPU to determine which interrupts have occurred and their priority relative to the active process executing on the CPU.

If the interrupt is associated with the CPU, the interrupt register is readily available for examination and determination of the proper interrupt handling process. However, if the interrupt is associated with an I/O device the interrupt register is stored at the I/O device. The I/O device issues an interrupt signal to the I/O interface, which stores an interrupt status bit for each device. The CPU must periodically examine the interrupt status register of the I/O interfaces to determine which device had an interrupt. The CPU then fetches the interrupt vector from the indicated I/O device and handles the interrupt. This process for determining interrupt conditions suffers performance disadvantages because valuable compute cycles are wasted while the CPU fetches the interrupt vector.

Accordingly, it can be seen that there are a number of situations that may arise during the operation of a multi-processor computer system that decrease the efficiency of system bus. Therefore it would be desirable to determine a method or apparatus that would provide increased multi-processor performance through improved utilization of system bus bandwidth.

SUMMARY OF THE INVENTION

According to one aspect of the invention, in a multi-processor computer system, a method for providing communication between two external devices coupled to two different external device busses, each of the external device busses being coupled to a common system bus by a respective bridge device, includes the steps of issuing, by the first external device, an request to access a portion of a memory space of the multi-processor computer system, where the portion of the memory space is allocated to accesses for said second external device. In response, the second bridge device detects the access request on the system bus as an access request for the second external device, and forwards the request to the second external device.

With such an arrangement, data transfer may be performed between two external devices coupled to two different external device busses without accessing a main memory and with using a minimal amount of host bus bandwidth.

According to a second aspect of the invention, the communication between devices coupled to different ones of the external busses is facilitated by re-ordering, at the bridge devices, commands that are pending in queues of the host bus bridge. With such an arrangement, communication between external devices on different external buses is enabled without the occurrence of deadlocking the multi-processor computer system.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENT

Figure 1:
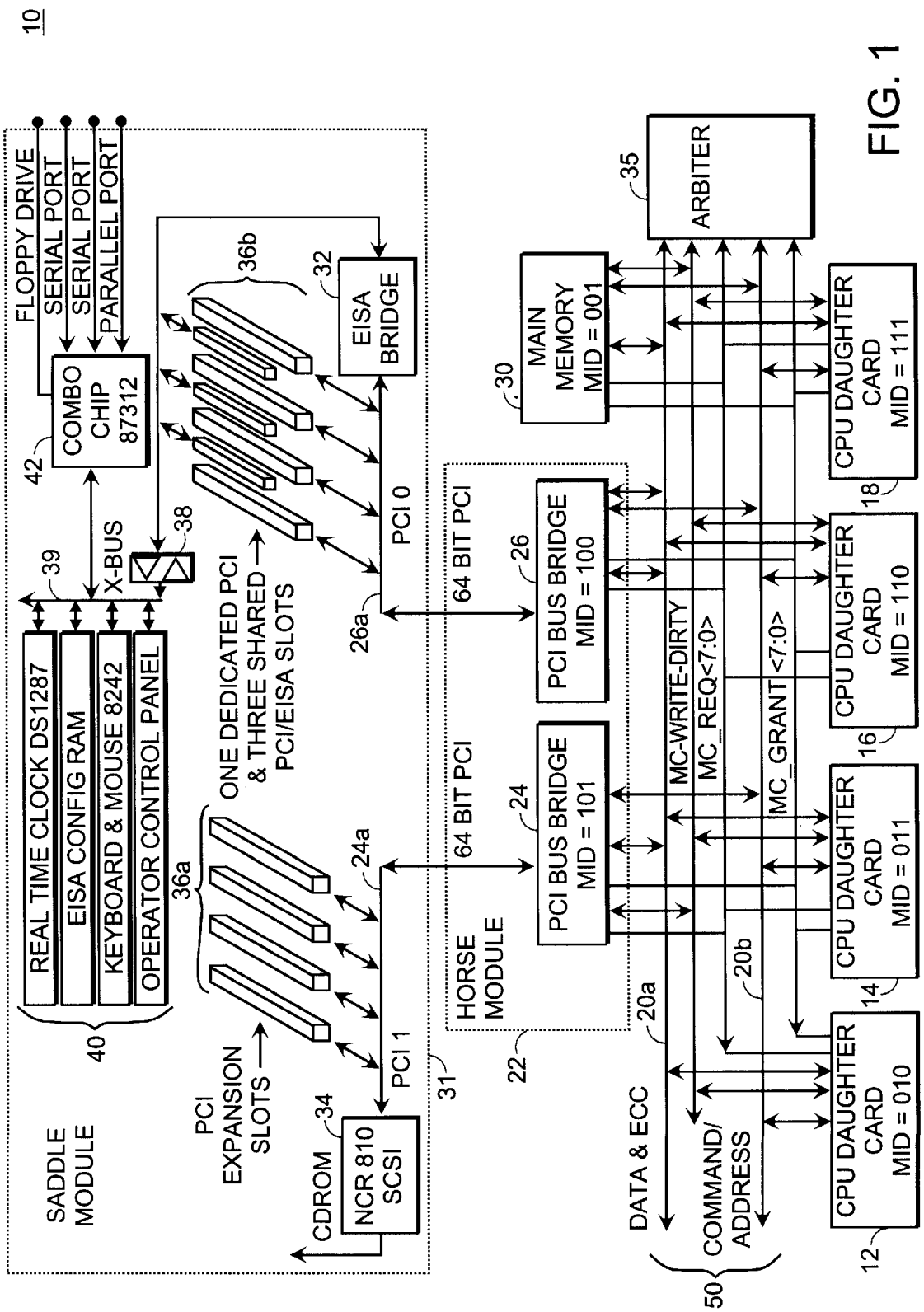
FIG. 1 is a block diagram of a multi-processor computer system according to the present invention.

Referring now to FIG. 1, a multi-processor computer system 10 is shown to include a plurality of Central Processor Units (CPU) 12–18 coupled together via a system bus 20. The system bus is shown to include two portions, a data and error correction code (ECC) portion 20a and a command/address portion 20b. Also coupled to the system bus is Input/Output (I/O) module 22. I/O module 22 is shown to include two (or more) I/O bridge units 24 and 26, which are each individually coupled to the system bus 20, also referred to as the MC bus.

The I/O bridge chips 24 and 26 here interface the system bus 20 to respective buses 24a and 26a, each of which operate according to the Peripheral Computer Interface (PCI) bus protocol. As it is known in the art, the PCI bus typically comprises 64 or 32 bits, for transferring data at a rate of either 267 MB/sec or 133 MB/sec respectively. Here, each of the PCI buses 24a and 24b comprise 64 bits of data.

The PCI buses are forwarded to an external device module 31. The external device module comprises a number of expansion slots into which external devices that communicate via the PCI protocol may be connected. In addition, PCI bus 26a is coupled to an EISA bridge chip 32. The EISA bus is another well known bus protocol to which various other external devices are designed. PCI and EISA expansion slots 36b are included on the external device module 31 to support 4 PCI devices and 3 EISA devices.

The output from the EISA bridge chip is fed to a transceiver 38 to provide xbus 39. Coupled to xbus 39 are various devices communicating via the EISA protocol, such as a real time clock, a keyboard, a mouse, and an operator control panel. In addition, also coupled to xbus 39 is a combo chip 42. The combo chip 42 may be used to provide data to a floppy drive and to receive network data from a serial and a parallel network port.

Coupled to PCI bus 24a is a Small Computer System Interconnect (SCSI) chip 34. This SCSI chip is used to couple PCI bus 24a to other external devices such as tape drives or CD Rom drives.

Multi-processor computer system 10 is shown to be a self contained unit comprising a plurality of processors that may be used to handle accesses from the devices coupled to external device module 31 via the I/O module 22. It should be noted, however, that the present invention is not limited to the arrangement or existence of certain ones of the external devices on the external device module 31. Rather, it will become apparent after a thorough reading of this specification that the techniques described may be equally advantageous in other multi-processor system configurations.

Also coupled to system bus 20 is main memory 30. The main memory is a resource that may be accessed by any of the central processing units 12–18 or the external devices via the I/O interface 22. The system bus 20 comprises 128 bits of data and 16 bits of error correction code. Thus, for each bus transaction, the main memory must be able to provide, or be able to consume, 128 bits of data per cycle in order to maximize system bus utilization and thereby maximize performance.

SYSTEM BUS COMMUNICATION PROTOCOL

The system bus 20 runs synchronous to the CPU and to the memory, with the bus cycle time being a multiple of the CPU clock. Central arbitration of the system bus 20 is controlled by arbitration logic 35. Associated with each of the devices coupled to the system bus, is a module identifier (MID). As each component forwards data onto the system bus, its module identifier is read by the arbitration logic 35. The arbitration logic determines, based on the module I.D. number and the pending request, which component has control of the system bus 20 for given transaction.

The protocol used to control arbitration is modifiable. This is because various arrangements and numbers of processor cards, or PCI cards, may be coupled to the bus, and as a result various types of arbitration protocols may be more appropriate to provide the highest level of performance.

For example, one arbitration mode is strict round robin, where device order is granted first to the PCI bridge and then to each successive PCI device in order. Another type of arbitration is referred to as the modified round robin type of arbitration. In this type of arbitration, the PCI bridge wins control of the PCI bus for every other transaction; thus the order would be the PCI device then the MC-PCI bus bridge, then the PCI device and then the MC-PCI bus bridge, etc.

Other methods of arbitration could similarly be used in the present invention as will become apparent upon further reading of this specification, and therefore it should be recognized that the method of arbitration should not be viewed as a limiting element.

Suffice it to say that data is transferred on the system bus in four consecutive cycles during either a write, read, or fill transaction. Write data is always driven in four preassigned data cycles relative to the start of the write transaction. Read data is returned either in four preassigned data cycles relative to the start of the read transaction (non-pended read) or at a later time during a separate system bus fill transaction (pended read). Fill data is always driven in four preassigned data cycles relative to the start of the fill transaction.

A dead cycle will usually be inserted on the system bus after each first of four data cycles to allow for a tri-state turn-on turn-off at each of the elements coupled to the bus. One exception to this dead data cycle occurs when two non-pended reads are returned from the same element RAM device in main memory 30. In this case, the dead cycle is not inserted and the data can be issued at the maximum bandwidth of the system bus of 1.066 gigabyte/second.

During operation, when any of the elements coupled to system bus 20 require access to the bus, each of the nodes sends a request signal to the arbitration logic 35 on MC_REQ lines 36. The arbiter sends a grant signal to each of the eight nodes on the corresponding signals MC_Grant_L 7–0.

Each of the elements coupled to the bus drives only one of the request lines and reads only one of the grant lines. When none of the request lines are asserted, the central arbiter 35 asserts the grant line to the last element that was granted a system bus. This behavior is referred to as bus parking. Note that even when the bus is granted to a node, a new transaction will not begin until the request line is asserted.

When a new transaction begins on the system bus, the arbiter 35 asserts the signal MC_CA. On an idle system bus, this signal may be asserted either one or three cycles after the request line is asserted. If the grant line was already asserted as the result of the bus parking feature described above, then when the request line is asserted, the arbiter 35 will assert the MC_CA signal one cycle later. If the grant signal was not asserted on an idle bus cycle, then when the request line is asserted the arbiter will assert the MC_CA signal three cycles later.

PARTIAL CACHE LINE WRITES

Figure 2:
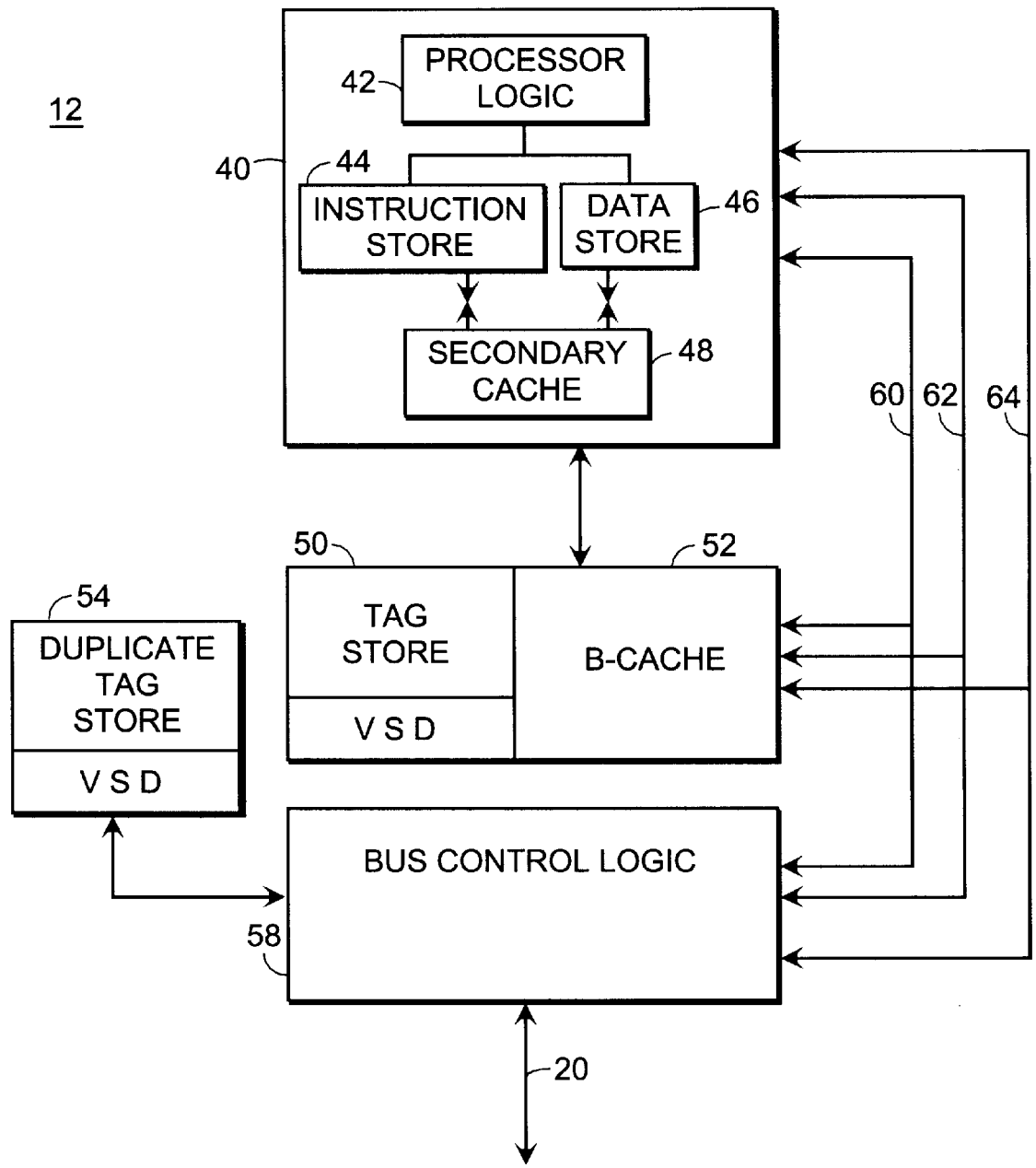
FIG. 2 is a block diagram of a cache control subsystem of a central processor unit of the multi-processor computer system of FIG. 1.

Referring now to FIG. 2, an example one of the CPU cards 12 is shown. The CPU card is shown to include a processor chip 40, which, for example, may be an Alpha® 21164 CPU chip manufactured by Digital Equipment Corporation™. The processor chip is shown to include processor logic 42 coupled to receive instructions from a primary cache that includes instructions store 44 and data store 46. In this version of the processor chip, a secondary cache 48 is included on chip for providing data to the respective instruction store and data stores to reduce the time required to obtain data from external memory.

The processor chip additionally includes a tag store 50 and a third level cache, here referred to as B-cache 52. As in the secondary cache, the B-cache is for temporary storage of large blocks of data that are retrieved from the main memory 30 (FIG. 1). By temporarily storing large portions of data in the B-cache, the period of time that the processor must wait to retrieve data and instructions from the main memory can be reduced to provide higher processor performance.

The B-cache is apportioned into blocks of data, (also referred to as cache lines) where each block of data may comprise, for example, 64 Kbytes of data. Associated with each block of data in the B-cache 52 is an entry in tag store 50. The tag store includes, for each entry, a group of status bits including a valid bit, a shared bit, and a dirty bit. The valid bit indicates that data in the block is valid and may be used by the associated processor. A Shared bit indicates whether or not that data has been loaded into the B-cache of more than one processor. If data is shared between processors, care must be taken to ensure that one processor does not make a modification that isn't reflected to the other processor. The Dirty bit indicates whether or not that block of data has been modified by the associated processor.

Table I below illustrates legal assertions of the Valid, Shared and Dirty bits for each Tag store entry, how those entry values indicate that the cache should control that cache entry, and how other processors treat a cache entry with those bits set in the tag store of another cache:

TABLE I

| Valid | Shared | Dirty | Associated Processor | Other Processors |
|---|---|---|---|---|
| 1 | 0 | 0 | may read freely, cannot write | Invalid |
| 1 | 0 | 1 | may read freely, may write freely, has most up-to-date copy | invalid |
| 1 | 1 | 0 | may read freely must broadcast writes | may read freely from cache, must broadcast write |
| 1 | 1 | 1 | may read freely must broadcast write has most up to date copy | may read freely from cache, must broadcast write |

Before a processor can mark an entry as DIRTY (i.e. modify an entry) it must first broadcast invalidates to all the other cacheable devices in the system. In addition, any device that attempts to read that block of data from memory must retrieve the Dirty block of data from the modifying processor in order to maintain data coherency.

Here, in order to maintain cache coherency, each device that includes a cache and is coupled to bus 20 operates according to a snoopy protocol. According to the snoopy protocol, the bus control logic 50 monitors or 'snoops' the bus to determine the type and address of requests being made of memory. Thus when processors execute requests over the system bus 20 to the arbiter 35 for access to main memory, each element that is coupled to the system bus monitors the transaction to determine whether or not these transactions will affect the content of the data stored in their B-cache. The use of a duplicate tag store 54 facilitates a determination as to the contents of the B-cache of the processor.

As discussed previously, both the PCI cards and the CPU cards are coupled to exchange data with main memory 30. However, typically I/O devices, for a cost sake, do not include the complex memory management architecture that is found on the central processing card. As such, when the I/O devices seek to access a block of data, they must make sure that they have the correct, updated version of data and they must make sure that other devices do not interfere with their transaction.

Atomic operations are typically used to ensure coherency for I/O devices. During atomic operations, no other devices are allowed to access the system bus between a read, modify and write operation. Rather, the I/O device has exclusive access to the system bus for the period of the atomic operation. However, atomic operations reduce performance because typically the I/O device is not modifying the entire block, yet other devices are prohibited from accessing memory until the end of the atomic transaction.

Performance is further reduced for instances in which the I/O device only writes a portion of a cache line for each operation. When only 16 bytes of a 64 byte line are modified by the I/O device, a Read/Modify/Write operation must be performed to accurately update the system memory contents. As a result, other devices are precluded from accessing memory for an even longer period of time for these partial cache line write operations. In addition, it is typically the case that the I/O device only updates a portion of the cache line, and thus this performance hit is incurred on the majority of I/O accesses.

The present invention improves the performance of partial cache line writes to memory in the following manner. Because many I/O devices generate data in sixteen or thirty-two byte writes, to optimize I/O writes the memory 20 must be capable of performing writes to individual aligned sixteen byte blocks. In addition, devices with cache memories must be capable of returning a Dirty signal if a cache line is marked as modified in its cache.

As a result, the protocols used to control cacheable devices on the system bus 20 may also permit the PCI bridges on the system bus to perform multiple I/O transactions as atomic operations. One implementation of the invention is capable of writing between 1 and 4 sixteen byte blocks in a single transaction.

Figure 3:
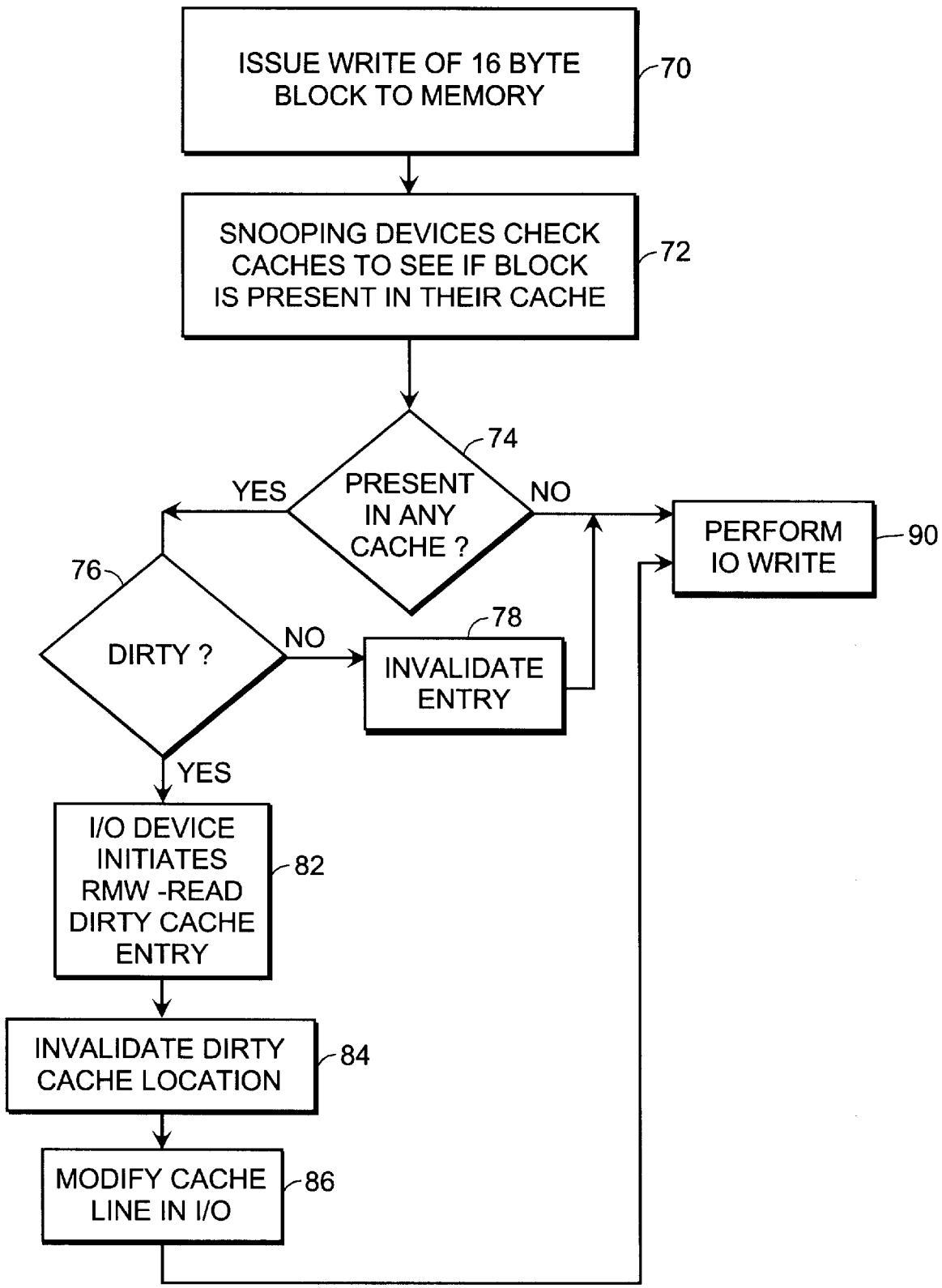
FIG. 3 is a flow diagram illustrating a cache write protocol for providing improved coherency of writes from non-cacheable devices to cacheable devices.

Referring now to FIG. 3, the operation of the present invention proceeds as follows. At step 70, the I/O device issues a write of a sixteen byte block to memory. All devices that are coupled to system bus 20, at step 72 monitor this bus transaction by snooping the bus and present the address to their duplicate tag store to determine if that block is present in their cache. If at step 74 it is determined that it is present in any of the caches, then each of those caches check the status bits of the entry at step 76 and, if the dirty bit for that entry is set, thereby indicating that that cache has modified that entry and not written it back to main memory, then that processor card with the dirty bit set asserts the MC_WRITE_DIRTY line over the system bus 20. (It should be noted that cacheable devices are capable of driving and receiving the MC_WRITE_DIRTY signal, yet the PCI bridges units only receive the signal).

If, within a time period in response to the request signal, none of the coupled cards has asserted the MC_WRITE_DIRTY signal, then the arbitration logic 35 assumes that the block is not dirty in any of the caches and at step 90, the I/O write is performed to main memory. At step 78, any of the devices that are storing the block (having the valid indicator set, but not the dirty bit) invalidate the corresponding B-cache location to prevent its use in subsequent operation.

If, however, it was determined that one of the caches was storing the entry and that the entry was dirty (i.e. the MC_WRITE_DIRTY bit is set) then at step 82, after the Dirty signal is propagated over the system bus, the I/O device initiates a Read/Modify/Write in response to this dirty signal. According to snoopy protocol, in response to the read operation, the cache with the dirty contents will respond to the read operation and forward the cache entry over the system bus to the requesting I/O device. Simultaneously, at step 84, that cache will invalidate the dirty cache location. Next, at step 86, the I/O device will modify the cache line entry to reflect the 16 byte block update. Next, the process resumes at step 90 where the I/O write is performed to main memory.

Figure 3A:
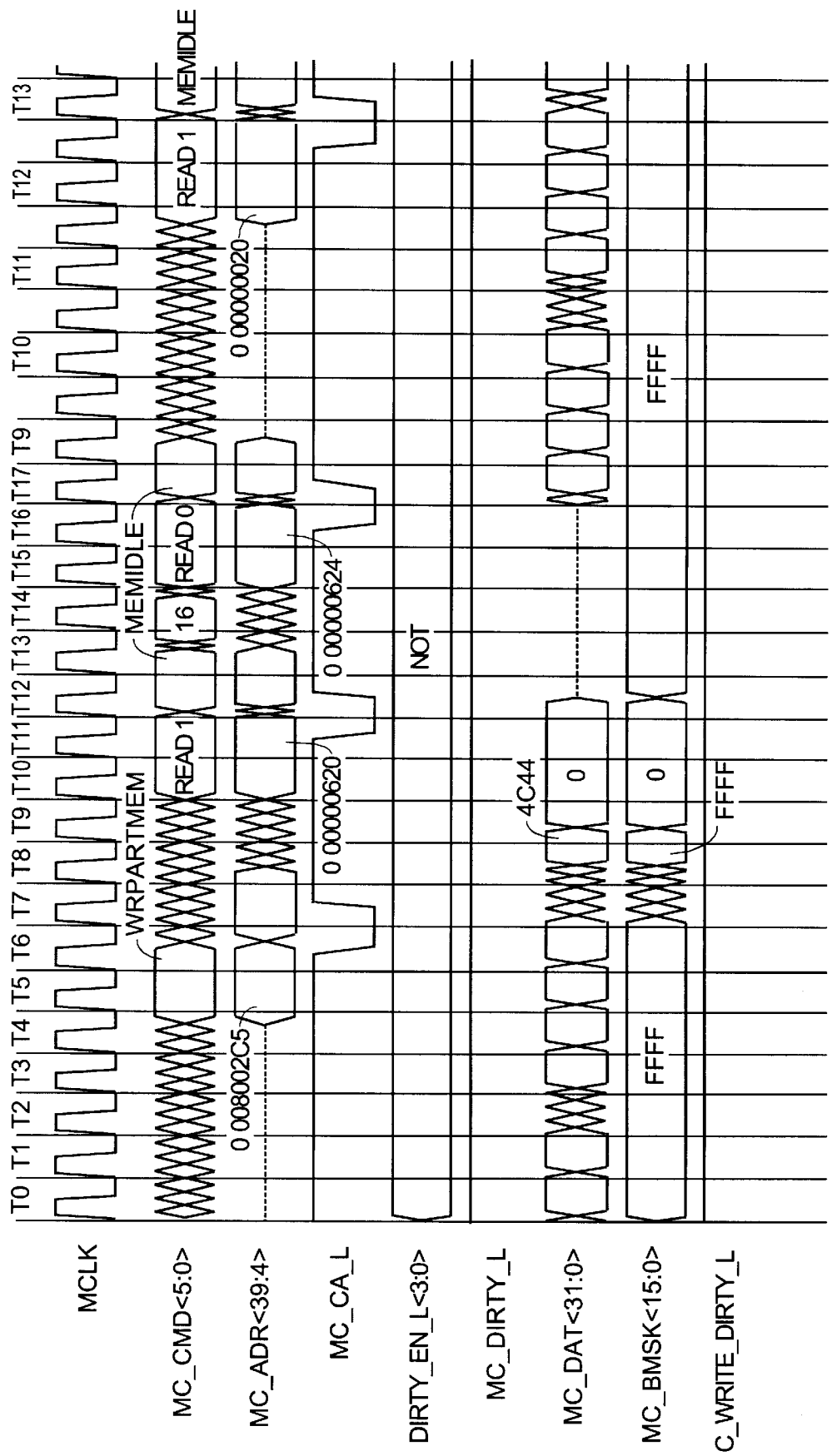
FIGS. 3A and 3B are timing diagrams for illustrating the operation of the cache write protocol of FIG. 3.
Figure 3B:
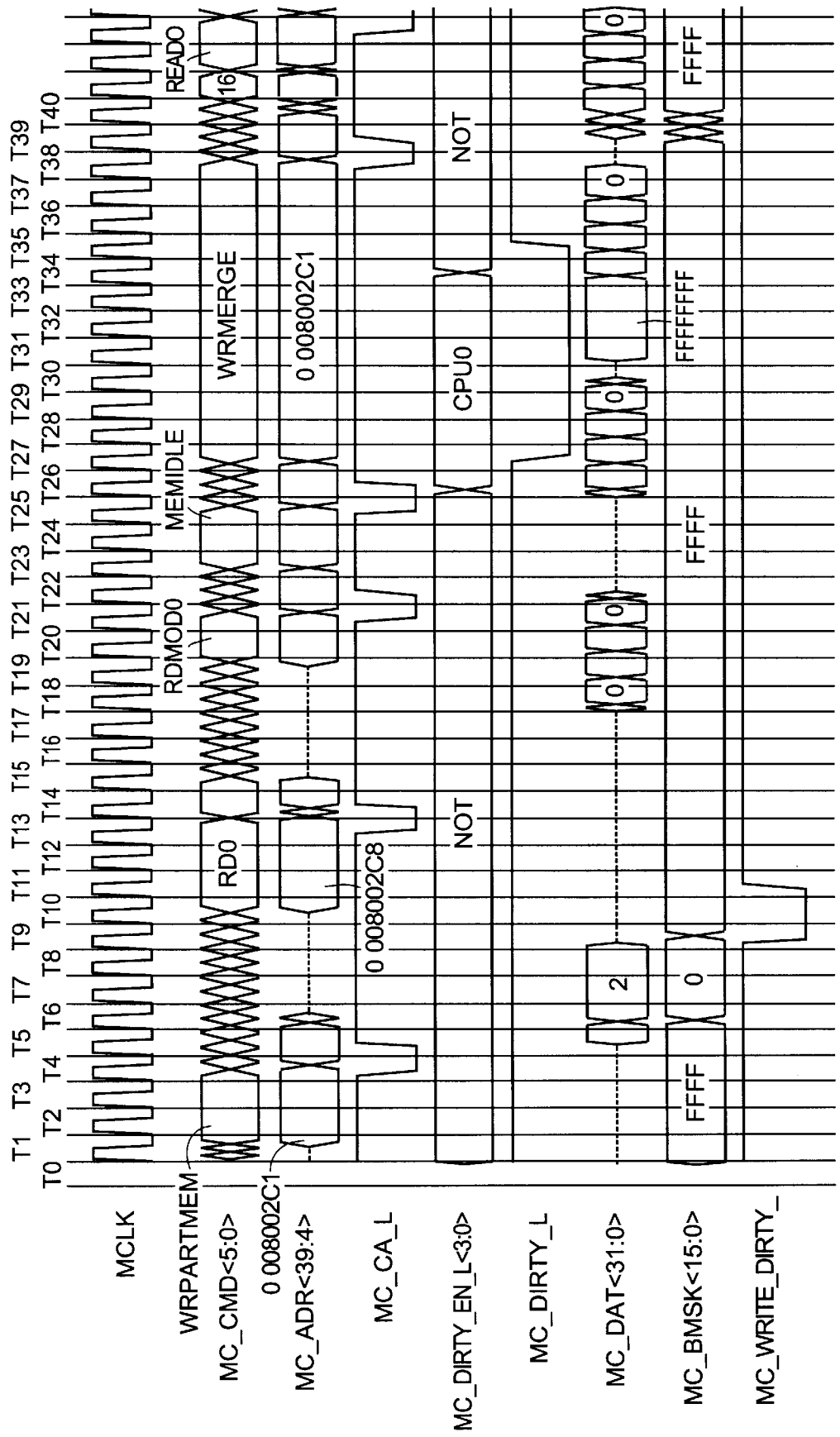

Referring now briefly to FIGS. 3A and 3B, two timing diagrams are provided for illustrating the assertions of the signals for partial write transactions. FIG. 3A illustrates the scenario described above where, at step 76 it is determined that the cache line is not DIRTY. FIG. 3B illustrates the case where the cache line to be modified is DIRTY and stored in the cache of another processor.

In FIG. 3A, at time T5, a Write Partial Memory command is issued over the system bus, with the address of #8002C5. The arbitration logic, in response to the command, asserts the MC_CA_L signal by pulling it low, to signal to other processors on the bus that a command has been issued. Each of the processors that monitors the bus checks the address issued over the bus against the contents of their tags. In the present instance, none of the processors had DIRTY data corresponding to that cache block, as indicated by the failure of the MC_WRITE_DIRTY_L line to be pulled low.

However, referring now to FIG. 3B, a Write Partial Memory instruction is issued at time T2. In response, at time T9, the MC_WRITE_DIRTY signal is pulled low. As described above, this means that a read/modify/write operation must be performed to obtain the dirty data from the apppropriate cache location.

At time T10, a Read0 command is issued over the bus. It should be noted that this Read0 command is unrelated to the Write Partial Memory instruction, and merely reflects the next command that made it to the bus via the arbitration logic. Of course, the logic could be designed to preclude this operation from being broadcast over the bus, however, such a design would undesireably reduce system performance. As a result, the Read0 command is broadcast on the bus, and then, at cycle T20 the Read/Modify Write operation is commenced.

During the period of the Read Mod operation (T20–T30), as described above, the processor whose cache stores the dirty data (shown in this timing diagram to be CPU0), drives the bus with the dirty cache line and simultaneously invalidates the corresponding entry in it's cache. The I/O unit merges its write data with the cache line from the CPU0, and stores the data to main memory with a write merge (T28–T38).

At this point, the cache line is invalid in all caches of the coupled cache devices so that any subsequent aligned 16 byte write from the same I/O bridge may be accomplished using a single bus write transaction to main memory. Thus, the present invention reduces the amount of bus transactions required to perform I/O write to main memory.

Take, for example, a DMA write sequence in which four partial (16 of 64 bytes) cache line writes are to be performed. Using the above described protocol, and assuming that the MC_WRITE_DIRTY signal is not asserted as a result of the first write, then the transaction could be completed in only four bus transactions. If, however, the MC_WRITE_DIRTY signal is asserted on the first write operation, then the order of operations would be Write (this Write causing the Dirty signal to assert), followed by a Read/Modify operation, a Write operation, and three more write operations, thus completing in only 6 bus transactions. In contrast, using the prior art mechanism of doing a Read/Modify and Write transaction, the above sequence would be completed in 8 bus transactions.

Accordingly, the present invention uses existing cache coherency logic to increase efficiency of write operations by non-cacheable devices. Because the integrity of the block is ensured by the atomicity of the I/O operation, the utilization of the DIRTY signal, and an appropriate invalidation protocol, allows for increased performance for partial cache line writes and consequently improved system performance.

PEER TO PEER DMA

The address space of the devices that are coupled to the system bus is apportioned such that the upper bit of the bus address, bit 39, identifies whether or not reads or write transactions to that address are stored in memory space or I/O space. Note that memory space is allocated to those devices that include cacheable control logic, whereas I/O space does not include cache control logic.

The I/O commands include a Read0-I/O and a Read1-I/O command. In these transactions, when the issuer of the transaction is a CPU, it is reading a 32 byte block in non-cacheable address space. If, in response to the Readx-I/O command, a pend confirmation signal is received, then the data is returned in the first two cycles of a subsequent Fillx transaction. If this Readx-I/O transaction receives a no ACK response, then no subsequent FILL transaction will be issued. The first two data cycles of the FILL transaction contain the 32 bytes indicated by MC_ADR [39:5] How the data is stored will be based on the MC_ADR[4].

If the target of the read I/O is another I/O device, additional addressing information may be indicated by the value of the MC_ADR signals in the first and second half of the address transfer. During the second half of the MC bus address transfer, the quadword mask information is placed on MC_ADR [11:8] (the longword valid [3:0] bits).

Other bus operations include a Read Peer0-I/O and the Read Peer1-I/O operation. Each of these Peer to Peer transactions selected bytes (0–63) of a 64 byte block stored on another I/O device. Thus these operations allow for one I/O device to read data stored in the I/O address space allocated to another I/O device. In addition, WRITE Peer0-I/O and WRITE Peer1-I/O operations are included for allowing an I/O device to write, at a byte granularity, to the I/O address space of another I/O device coupled to a different Host PCI Bridge.

Other bus transactions include the Fill0, and Fill1 bus transaction. This transaction is used to return data to a pended transaction (either memory space or I/O space). The FIll0 transaction is used to return data to a pended Read0 type transaction while the Fill1 transaction is used to return data to a pended Read1 type transaction.

The existence of the Read Peer0, Read Peer1, Write Peer0, Write Peer1, Fill0 and Fill1 commands, in combination with an address allocation of method of the present invention, improves overall performance by allowing for I/O devices coupled to different PCI bridges on a common MC bus to exchange data without having to access main memory 30.

Figure 4:
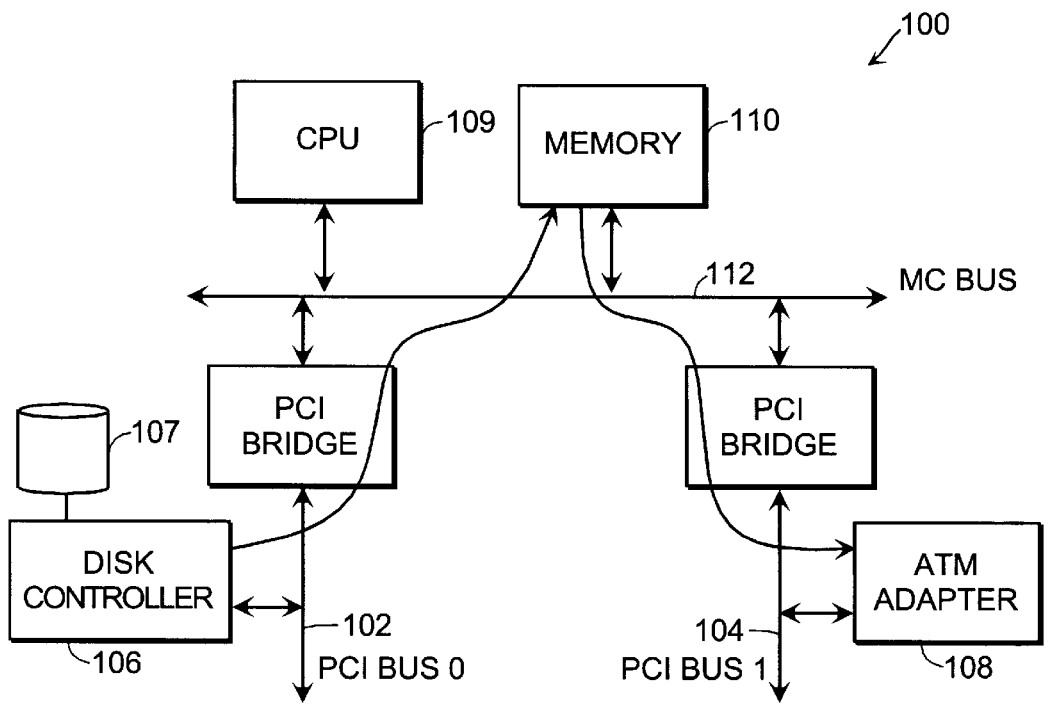
FIG. 4 is a block diagram of a multi-processor computer system similar to FIG. 1 for illustrating a prior art communication technique between I/O devices coupled to different I/O bridges.
Figure 5:
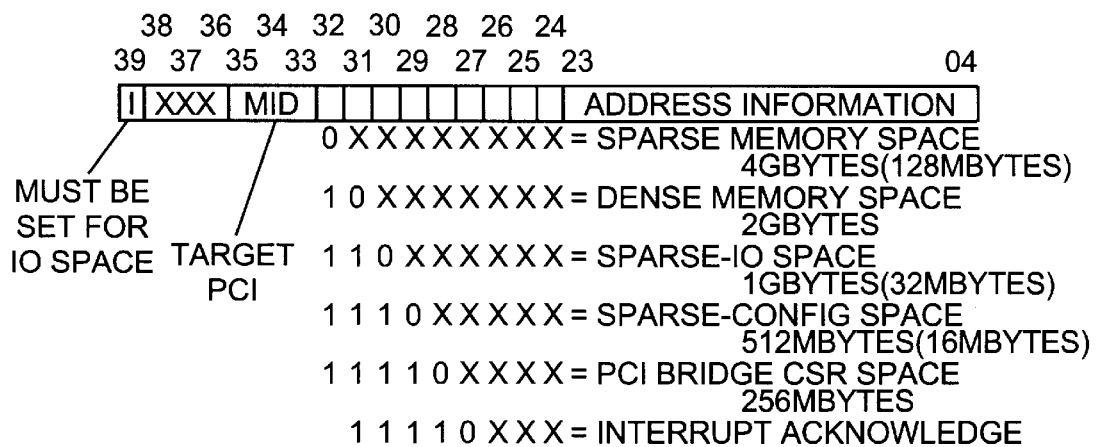
FIG. 5 illustrates the address space encodings for the memory and I/O subsystems of the computer systems of FIG. 1.

Referring now to FIG. 4, an abbreviated version of the computer system 10 is shown as computer system 100. As mentioned previously above, typically I/O devices do not include a cache memory subsystem. Accordingly, whenever an I/O device seeks to write data in main memory, it must read the contents of an entire cache block in the main memory, merge write data into the block, and then write that cache block back to main memory. This is typically performed via an atomic Read/Modify/Write (RMW) direct memory access operation.

Typically, in a direct memory access operation, a read or a write is issued with an idea of the size of the data block that is to be transferred for that operation. Then, the number of required data blocks are transferred directly from the source device to the target device. For a write, the operation is performed similarly; where the writing device begins the DMA transaction by forwarding the data in repetitive cycles to the destination host bus bridge. The host bus bridge breaks the transaction into cache block size chunks, and transfers the chunks to main memory.

In a computer system such as system 10 or system 100, there may be I/O devices located on separate I/O buses, such as PCI bus 102 and PCI bus 104. For example, a disk controller is shown coupled to PCI bus 102 while an ATM adapter, for coupling the PCI to the network, 108 is shown coupled to PCI bus 104. It may occur that some network device coupled to the ATM adapter 108 requires data from the computer system that is stored on an external storage device such as disk 107 coupled to disk controller 106. In such an event, the ATM adapter, typically in the prior art, would issue a request for data to the CPU. The CPU would poll the memory management system using the address provided by the ATM adapter discover that the data was currently stored on the disk device 107. The CPU would then issue a Disk Read/DMA Write operation to copy the data from the disk controller to the memory 110. Upon completion of the DMA transfer, the CPU device would then issue an ATM Write/ DMA read operation to transfer the data from memory 110 over to the ATM adapter 108.

Thus it can be seen that numerous performance overheads result from this type of transaction when two I/O devices coupled to different I/O buses wish to communicate. In addition, there is twice as much data transfer that has to occur on system bus 112 which further reduces performance, since both a write to memory 110 must occur, and a write to the ATM device 108 must occur to complete the transaction.

The present invention overcomes the performance problem inherent in peer to peer I/O device communication by providing a link mechanism that allows for I/O devices coupled to different ones of the I/O buses to communicate directly without the need to access memory 110 or use compute cycle of CPU 109. As a result, the efficiency of MC bus utilization is further increased.

The present invention achieves this communication link by appropriately apportioning address space and providing a bus protocol that allows for any device coupled to the system bus 112 to have direct communication with any other device coupled to the system bus without requiring cycles from CPU 109 or memory 110.

The address space allocation is provided as follows. The PCI memory space may be accessed through a dense or a sparse address space, depending on the type of addressing mode that is used in the MC address field. Dense space provides access to a two gigabyte region of PCI memory space. Accesses to dense space only reference aligned, longword and quadword PCI memory addresses. A dense space read will generate a burst of two longword reads on the PCI; a dense space write will generate a burst of up to eight longword mask writes on the PCI when a CPU is the source of the write. However, in the present invention, Peer access may have byte granularity in dense address space.

It should be noted that because the present invention operates using dense space accesses, therefore only the dense space configuration will be described herein. It is envisioned that alterations may easily be made by one of skill in the art to use other address space constraints, and thus the present invention should not be limited to merely the methods described below.

When dense space is the target of peer to peer DMA reads the PCI bridge such as one entire cache line for each bus transaction. Dense peer to peer DMA writes are treated the same as dense I/O to local memory writes except that they may include up to two double hexawords at a time.

Writes to PCI memory space are not merged by PCI bridge hardware. Writes are issued on the target PCI bus in the order that the writes are issued across the MC bus independent of the source, CPU write or peer to peer DMA write.

Figure 6:
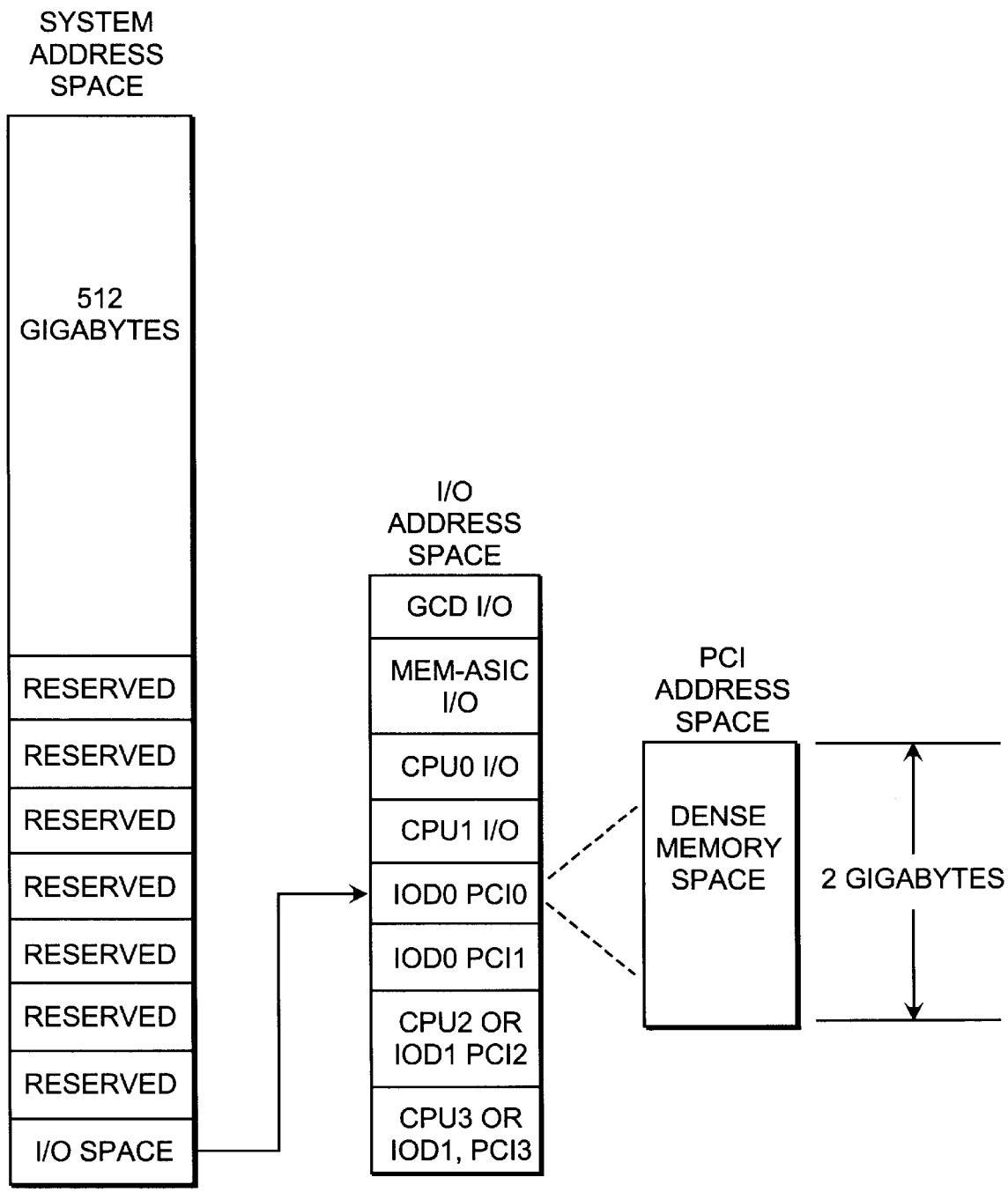
FIG. 6 illustrates a translation flow from a system space address to an I/O space address in the computer system of FIG. 1.

Referring now to FIG. 6, an example of how the system physical addresses are mapped to PCI addresses is provided. The indicating arrows 120a and 120b illustrate the translation path from MC address space to PCI address space. For example, an address to I/O space 120 gets mapped to a specific device I/O space on a Host Bus bridge. By way of example, this address is shown to map to dense memory space and is translated into PCI address dense address space 126.

Figure 7:
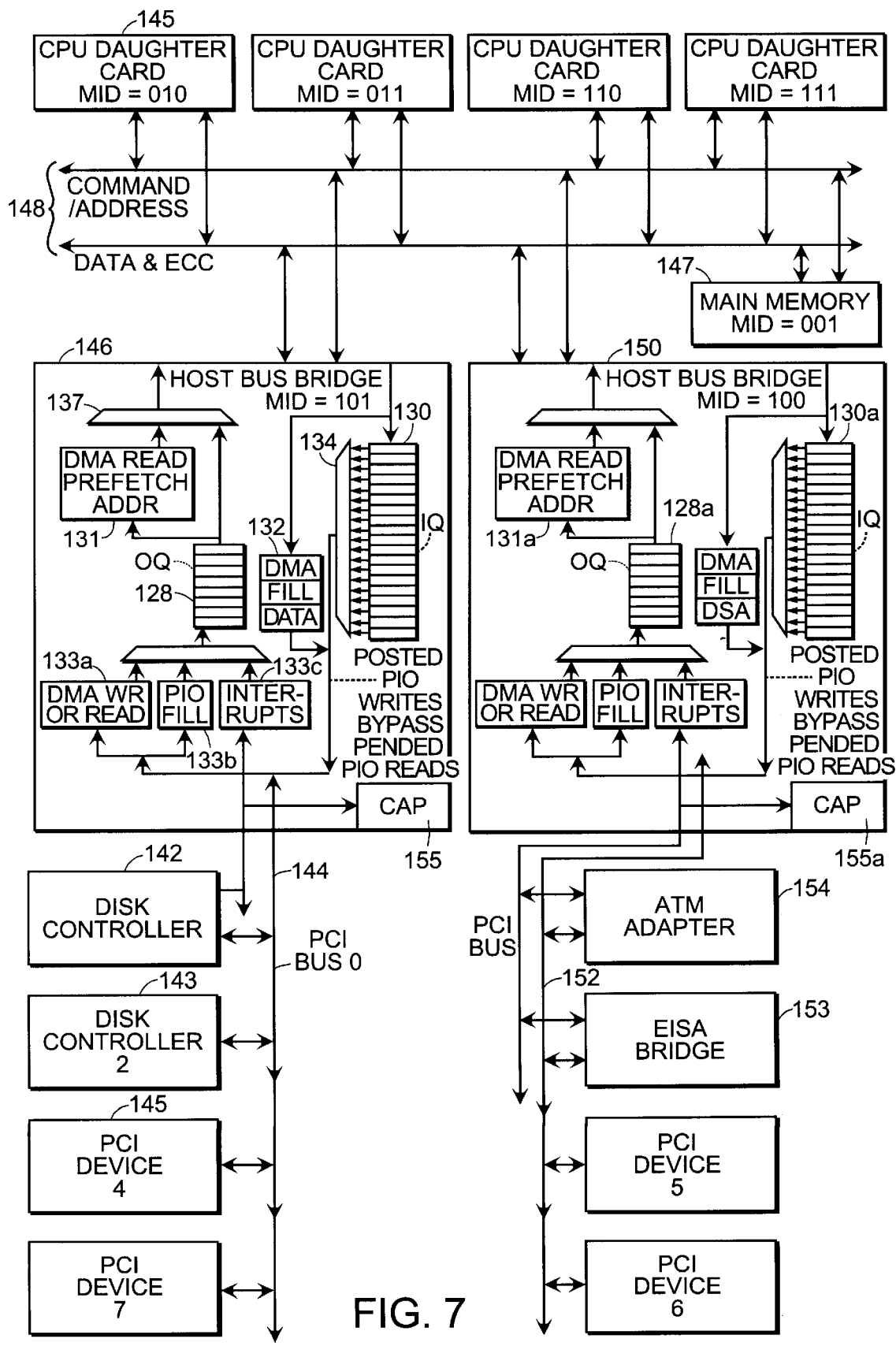
FIG. 7 is a high-level block diagram of a computer system similar to FIG. 1, for illustrating a communication from between I/O devices coupled to different I/O bridges.

Referring now to FIG. 7, the process of peer to peer address space translation will now be described with reference to the abbreviated diagram, the abbreviated computer system 140. As shown in FIG. 7, the abbreviated computer system 140 includes a disk controller 142 coupled to PCI bus 144. The PCI bus 144 is coupled to MC bus 148 via Host Bus Bridge 146. Also coupled to MC bus 148 is Host Bus Bridge 150 which provides an interface between PCI bus 152 and MC bus 148. Coupled to MC bus coupled to PCI bus 152 is ATM adapter 154. The present invention allows for data to be directly transferred via a DMA operation from disk controller 142 through Host Bus Bridge 146 onto MC bus 148. This data is then picked up by PCI Host Bus bridge 150 and forwarded to ATM adapter 154.

In FIG. 7, each Host Bus Bridge unit 146 and 150 has been expanded to illustrate the included data path hardware. Note that Host bus Bridge 146 and 150 are here shown to include identical data paths, though it is not a requirement that both bridges be identical. Rather, each bridge should include the necessary data path in order to provide some sufficient buffering as described below.

Host bus bridge 146, for example, is shown to include an Input Queue (IQ) 130, coupled to receive data from host bus 148. The Input Queue is also coupled to drive the data stored in the IQ 130 onto the PCI bus 144.

A DMA Fill Data buffer 132 is provided for allowing a fast transfer of DMA data between the system bus 148 and the PCI bus 144 by providing a bypass of the IQ 130.

An Output Queue (OQ) 128 is shown to recieve data from on of the external devices coupled to the the PCI bus 144. The data may be transferred as a result of a DMA read of one of the external devices, a DMA write from one of the external devices (to, for example, memory 147), or a Programmed I/O Fill operation. In addition, each device may also be sending interrupt information to the Host Bus Bridge. Each form of data is stored and filtered through a separate data path for transfer to the Output Queue 128. Data from the OQ 128 is forwarded either directly or via the DMA read Prefetch buffer 131 to the host bus 148.

When an external device such as disk controller 142 seeks a write a portion of data, it forwards a PCI address to the PCI Host Bus bridge 146. Incoming PCI addresses, either 32 bit or 64 bit, are re-mapped into MC bus address space. According to this embodiment of the invention, four programmable address windows and one fixed window control the access of the PCI peripherals to system memory and global address space. The mapping from PCI address to the physical address can be performed in either one of two ways. The first way is a direct mapped approach, where the physical mapping is performed on a one to one basis with an address offset. The second mapping is performed via a scatter gather approach where virtual addresses are used on the system address space portion of the translation. The four programmable address labels are hereinafter referred to as PCI DMA target windows. The fixed window is hereinafter referred to as the monster window.

PCI address and commands are captured in a command and address path chip 155 of the Host bus bridge. The address is compared with the five address windows space to determine if this PCI transaction should be accepted or ignored by that Host Bus bridge 146. Address windows are requirements of the PCI specification and four of them are software configurable. All PCI commands that target memory must past through the Host bridge 146.

Each programmable window has three registers associated with it for the purposes of computing addresses. These registers include the PCI base register, the PCI mask register, and the translation base register. The PCI base register defines the start of target window. This register holds the SG bit which indicates whether the scatter gather map is used for this translation or whether or not it is simply a direct map transaction. The PCI mask register defines the size of the window. The translation based register holds the base address used to relocate the PCI address within the CPUs memory space for direct mapping. It is also used to hold the base address of the scatter gather map for scatter gather mapping. In addition, there is an extra register associated with one of the DMA windows. It is the DAC base register and is used for PCI 64 bit addressing for dual address cycle mode. Each programmable window provides the mask corresponding to bits 31–20 of the incoming PCI address. The size of each window can be programmed in power of two increments from one megabyte to four gigabytes by masking bits of the incoming PCI address using a 12 bit PCI mask register.

As mentioned previously, the SG bit determines how the PCI address is to be translated; if the SG bit is clear, then the address is directly mapped by concatenating the values stored in the translation base register to the address. Otherwise the address is mapped through the scatter gather table allowing any 8 KB of PCI address to map to any 8 KB of system address space using virtual addressing techniques.

Figure 8:
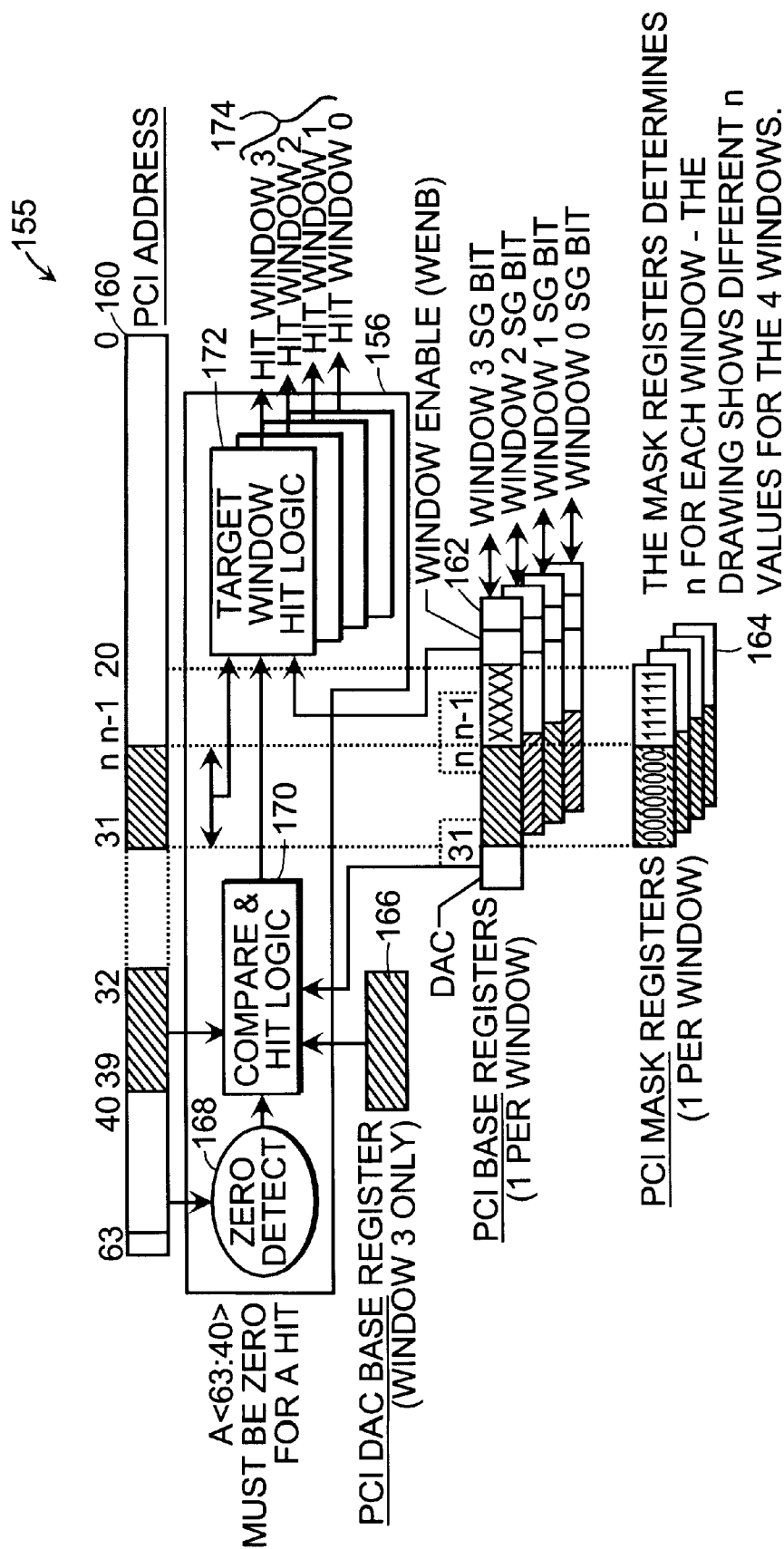
FIG. 8 illustrates logic included in a PCI bridge of the computer system of FIGS. 7 or 1, the logic determining a target hit for I/O write purposes.

Referring now to FIG. 8, a portion of the command and address path (CAP) gate array and the Host bus bridge (146 or 150) is shown to include compare logic 156 coupled to receive input from the PCI address register 160 and to provide hit signals 174. The compare logic additionally receives input from the PCI base registers 162, where there is one register per window and from the PCI mask registers 164 where there is similarly one register per window. In addition, the compare logic also receives data from the PCI DAC base register. In order for there to be a most significant bit 40–63 of the PCI address must be zero. As such, a fast zero detect circuit 168 is provided to provide the fast data path. The zero detect provides an enable signal to the compare and hit logic 170.

The compare and hit logic 170 compares the bits 39–32 of the PCI address against data from the PCI base registers windows and the dual address control base register 166 and forwards output data to the target window hit logic. The target window hit logic compares bits 31 to end of the PCI address with data from the PCI base registers to determine if this PCI address is in one of the four PCI windows coupled to the bridge or allotted to the bridge chip. If so, one of the associated hit signals 174 is asserted.

Figure 9:
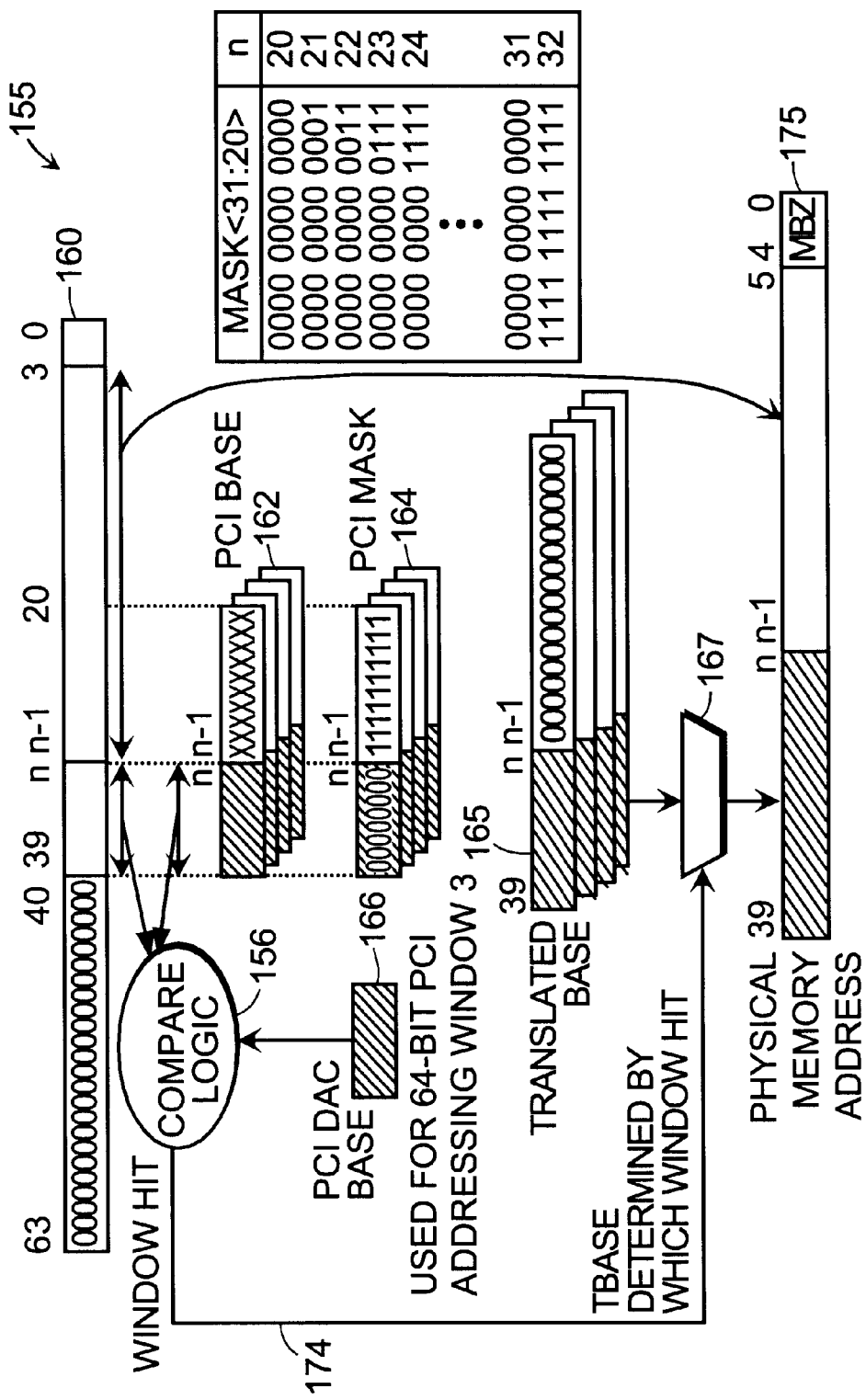
FIG. 9 illustrates logic included in a PCI bridge of the computer system of FIGS. 7 or 1, the logic for translating via PCI address space and dense system address space.

Referring now to FIG. 9, the CAP circuit is further shown in more detail for the purposes of describing a translation using direct memory access techniques. If the SG bit is clear in the PCI address, then the DMA address is direct mapped and the translated address is generated by concatenating bits from the matching windows translated base register with bits from the incoming PCI address. The bits involved in this concatenation are defined by the PCI mask register. Unused bits of the translated base register are advantageously clear to allow the hardware to perform an OR function for concatenation.

Since the translated base is simply concatenated to the PCI address, then the direct mapping is to a natural aligned memory region. For example, a 4 MB direct-mapped window will only map to any 4 MB region of main memory that falls on a fair megabyte boundary (for instance, it is not possible to map a 4 MB region to the main memory region 1 MB–5 MB).

In calculating the physical memory address, as shown in FIG. 9, bits [39:n] of the PCI address are compared with PCI base addresses for the appropriate window (as identified by the compare logic 156). There being a match then the PCI mask register of the appropriate window is selected to forward the appropriate bits of the PCI address to the translated base register 165. Note that this occurs for all of the windows and then a multiplexing operation is controlled by the window hit signals on line 174 to place the appropriate bits in the [39:n] bit locations of the physical memory address in the physical memory address register 175.

Figure 10:
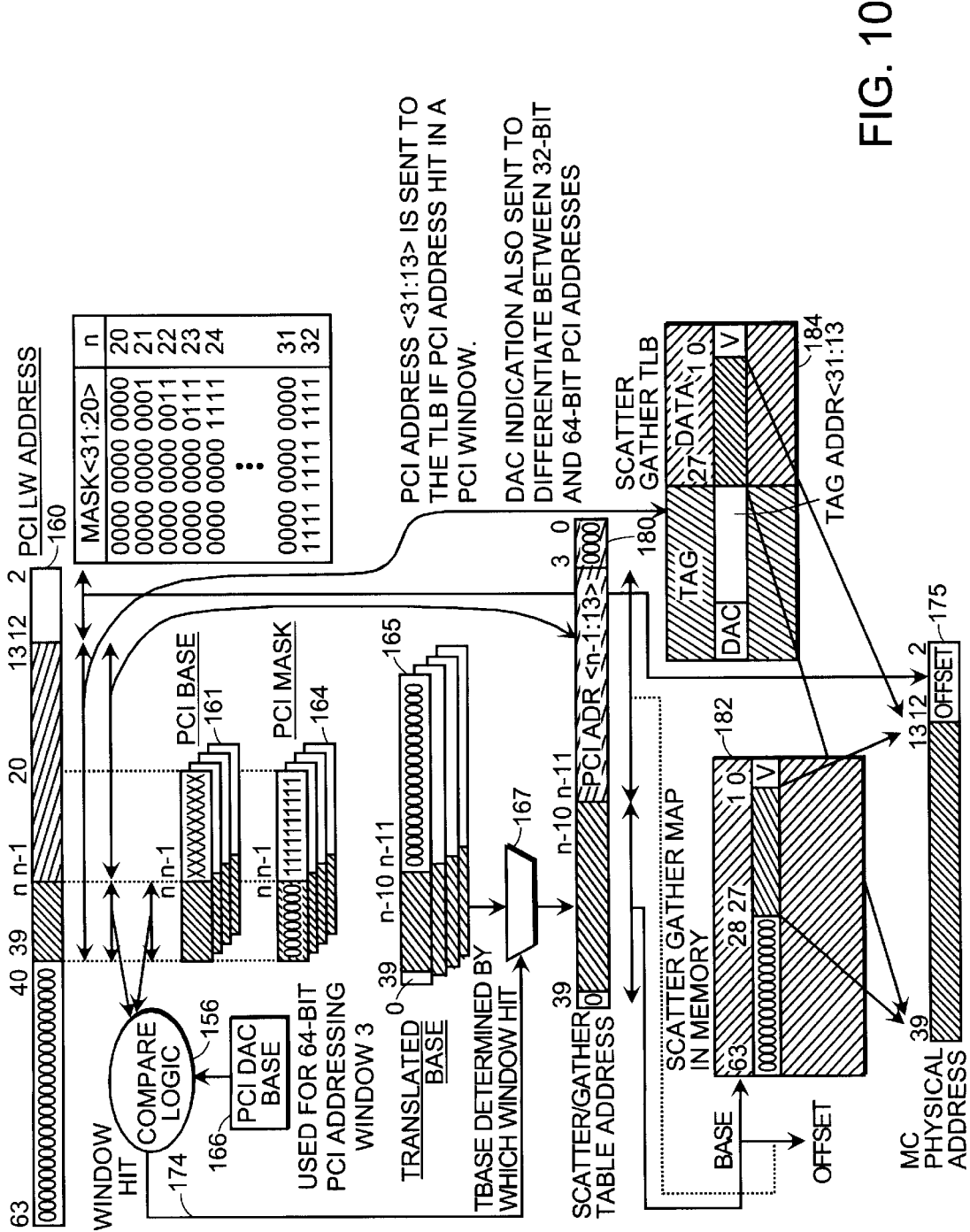
FIG. 10 illustrates logic included in a PCI bridge of the computer system of FIGS. 7 or 1, the logic for translating via PCI address space and sparse system address space.

Referring now to FIG. 10, if the SG bits of the PCI based register are set, then the translated address is generated using a scatter gather map 182. The incoming PCI address 160 is compared to the PCI base addresses of the windows to determine whether or not there is a hit by compare logic 156. The translated base register, associated with the PCI window that is hit, is used to specify the starting address of the scatter gather map in memory. Bits of the incoming PCI address are used as an offset from the starting address to access the scatter gather page table entry in the scatter gather translation look ahead buffer 184. The output from the page table entry stored in the translation look ahead buffer 184 is used in conjunction with the remaining significant PCI address bits to form the required memory address.

Each scatter gather map entry maps an 8 KB page of PCI address space into an 8 KB page of processor address space. This offers a performance advantage since it allows external devices to map to lower 16 MB of memory, and operating systems such as Windows NT® currently copy data from the lower 16 bytes of memory to user space. The use of the scatter gather map of the present invention allows for this copy to be avoided since direct access may be gained to the data via appropriate addressing.

The above addressing scheme additionally improves performance since interface I/O buffers cannot be counted on to be physically contiguous nor contained within a page. Therefore, without use of the scatter/gather addressing mechanism, software would be required to manage the scattered nature of the user buffer by performing numerous copy operations. Accordingly, by providing the scatter gather map and apportioning the I/O addresses in such a manner, a straight forward address translation path is provided between PCI external device address and the MC bus address space.

Accordingly, because address translation may be quickly accomplished, DMA operations between I/O devices on different PCI buses may be facilitated since all devices are able to communicate via I/O windows that provide appropriate translation mapping.

Figure 11:
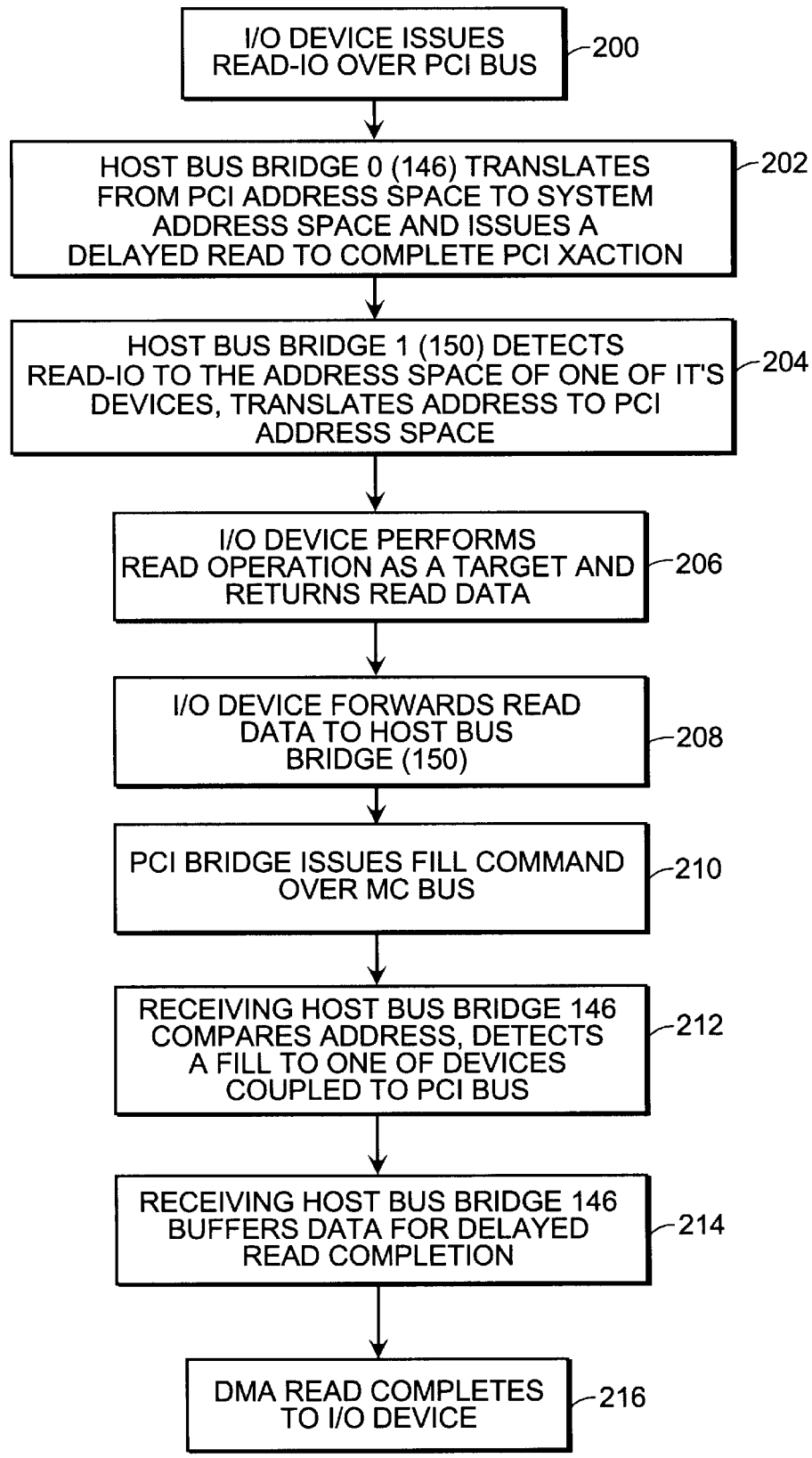
FIG. 11 is a flow diagram for illustrating the protocol used for allowing peer-to-peer communication between I/O devices coupled to different I/O busses.

Referring now to FIG. 11, a process used to perform a DMA write and read operation between PCI devices coupled to different PCI buses via the system bus is shown and will be described with reference to the elements shown in FIG. 7.

At step 200, the controller 142 issues a read command on PCI bus 144. The Host Bus Bridge 146 compares the PCI address issued on bus 144 to detect whether or not it targets one of the PCI windows in system memory. If it does target one of those addresses, then at step 202 a translation is performed between the PCI address space and the physical memory address space as shown in either FIG. 9 or FIG. 10 depending upon whether the command direct mapped or scatter/gather read. The translated physical address and a Delayed Read command are issued on MC bus 148, with the bit 39 of the address set to indicate an I/O transaction.

The Host Bus Bridge 150 detects the Read-I/O transaction and decodes the address to determine whether it is an address space that may be used by any of the devices coupled to its PCI bus 152. If it is, the Host bridge translates the system address into a PCI address and command and issues it onto PCI bus 152. At step 206, 1/0 device 154 responds to the read operations by accessing its address space. At step 208, I/O device 154 returns read data to the host bus bridge 150.

Once the read data has been received, the Host Bus Bridge 150 issues a Fill command over the MC bus. At step 212, receiving Host Bus Bridge 146, having been monitoring bus 148, compares the address and detects a Fill to one of the devices coupled to its PCI bus. At step 214, the Host Bridge 146 buffers the fill data for completion of the delayed Read transaction. At step 216 the I/O device reissues a Read command for completion of the delayed read transaction.

Thus far the Peer-to-Peer transaction has been discussed as a single sequence of events. However, it should be noted that in order to allow for the Peer-to-Peer tranaction to be successful, certain modifications had to be made to the Host Bus Bridge architecture. These modification include allowing Posted PIO write operations to bypass certain read operations, allowing DMA return data to bypass posted PIO writes, and by precluding PIO Read return Data from bypassing DMA Posted Write Data. These out-of-order execution techniques are advantageous for precluding deadlock from occuring for the peer-to-peer transaction.

Before describing the control required for out of order execution for preventing deadlock, a brief description of the types of commands that may be transferred through the Host Bus Bridge will be provided. A Programmed Input/Output (PIO) transaction is a transaction through the Host Bus Bridge initiated on the system bus with the target of the transaction being on the PCI bus. An example of such a transaction is when a CPU seeks to read a register of an external device. A Direct Memory Access (DMA) tranaction is a transaction through the Host Bus Bridge initiated by a device coupled to the PCI bus with a target on the System Bus. The target may be memory, or it may be another PCI device coupled to the system bus via the Host Bus Bridge.

A POSTED transaction refers to a transaction that has been issued and data accepted by an intermediate bridge but the data has not yet been wrtten to the target. A PENDED transaction is any transaction that has been split in two; a request and a response. In the case of a read transaction, the request is called a PENDED READ and the response is called the READ RETURN DATA. In the case of a Write transaction, the request is called a PENDED WRITE and the response is called a WRITE PEND ACKNOWLEDGE.

Peer-to-Peer transactions operate without deadlock due to the following design considerations. First, the system bus 28 uses a pended transaction protocol for flow control. Second, as dictated by the PCI bus protocol, PCI Bus arbitration logic permits Host Bus Bridge POSTED and PENDED PIO transactions to have higher priority than PCI devices once the Host Bus Bridge wins the arbitration, provided the bridge has work to do (or until the latency timer expires).

The present invention further enhances the PCI protocol to allow for POSTED PIO WRITE transactions to bypass pended reads, to allow DMA READ RETURN DATA to bypass posted PIO write data, and to preclude PIO READ RETURN DATA from bypassing DMA POSTED WRITE data. In addition, the present invention translates peer read transactions to PCI delayed read transactions. These enhancements to the PCI protocol accomodate peer-to-peer transactions between I/O devices coupled to different Host Bus bridges without causing deadlock.

For example, referring again briefly to FIG. 7, using the defined PCI protocol, a deadlock of the computer system may occur in the following situation. First, Disk Controller 142 initiates a peer-to-peer DMA block write targeting ATM adapter 154. Then, EISA Bridge 153 initiates a Peer-to-Peer DMA block write targeting Disk Controller 2 143. As a result, both the OQ 128 in host bus bridge 146 and the OQ 128a in host bridge 150 stall waiting for acknowledgement of the Peer-to-Peer DMA writes.

Subsequently, CPU0 145 posts a control status register read of any of the devices coupled Host Bus bridge 150. Also, CPU0 145 posts a control status register read of any of the devices coupled to Host Bus bridge 146. Then, PCI Device 4 posts two delayed DMA reads of PCI device 5, and PCI device 6 posts two delayed DMA reads of PCI device 7.

If all the above transactions stay in order, the following occurs. The two Peer-to-Peer DMA writes stall the OQ waiting for write pending acknowledgement. The DMA read fill data buffers 132 and 132a each get used by the first two reads. The delayed DMA read of device 5 and device 7 are stalled in the Input Queues 130a and 130, respectively.

When the response to the DMA write return data is available, it will be transferred to the IQ of the respective Host Bus Bridge. However it will stall behind the Pended read. The pended reads will stall because the OQ is stalled waiting for the return write data, that is now in the IQ, yet unavailable. As a result, the system will deadlock.

To fix this problem, pending Peer-to-Peer DMA writes are allowed to bypass pended PIO reads in the IQ. As a result, the IQ can be drained such that the pended Peer-to-Peer writes complete, write pend acknowledgements are issued, and as a result the OQ also drains.

The OQ 128 and the IQ 130 can aways be drained by permitting posted write transactions to bypass pended read transactions in the IQ 130. A side effect of this operation is that it allows posted writes that target another bridge to also be drained. In addition, Fills, Interrupts, and PIO Read Fill operations will bypass Delayed PCI DMA Read transactions in the OQ 128.

Accordingly through proper control of the flow of data through the Input and Output Queues, Peer-to-Peer transactions can be supported without the occurrence of deadlock situations. Table II below defines the ordering of transactions will take as they pass through a given Host Bus Bridge. In Table II, DMA transactions indicate transactions initiated by a PCI device, where the target is an I/O device coupled to another bridge. These transactions will typically be stored in the Output Queue 128 on the Host bus Bridge. PIO Read and Write transactions are transactions on the system bus directed towards a device coupled to a PCI bridge. The PIO Read andWrite operations are stored in the Input Queue 130 of the Host Bus bridge. The PIO Fill transaction, since it is driven by a PCI device, is stored in the Otuput Queue, as is the Interrupt control commands.

In addition, the following abbreviations are used below: PMW is a Posted Memory Write, DRR is a Delayed Read Request, DRC is a Delayed Read Completion, DWR is a delayed write request, and DWC is a delayed write completion.

TABLE II

| First Queue Entry | | PIO Write | PIO Read | PIO Fill | DMA Write | DMA Read | DMA Read Return | Write Pend Ack | Interrupt |
|---|---|---|---|---|---|---|---|---|---|
| Second Queue Entry | | PMW | DRR | DRC | PMW | DRR | DRC | | |
| Pass?? | | | | | | | | | |
| PIO Write | PMW | No | Yes | | | | Yes | | |

TABLE II-continued

| | | | | | | | | |
|---|---|---|---|---|---|---|---|---|
| PIO Read | DRR | No | No | | | | Yes | |
| PIO Fill | DRC | | | No | No | Yes | | |
| DMA Write | PMW | | | No | No | Yes | No | |
| DMA Read | DRR | | | No | No | No | No | |
| DMA Read Return | DRC | Yes | Yes | | No | No | No | |
| Write Pend ACK | | | | | | | No | |
| Interrupt | | | | | | | | No |

Note that when a DMA read or a DMA Delayed Read is active, no other transaction is allowed in the DMA direction. Also note than a CPU can have two outstanding pending reads or one outstanding pended write but will not have both outstanding at the same time. Blank boxes indicate transactions that are not applicable because they are in independent queues and there is no relationship between these transactions.

Referring again briefly to FIG. 7, the above control listed in Table II is used to drive the select lines of multiplexer 134, to allow entries decoded as PIO Writes to bypass Pended PIO reads. The DMA Read Prefetch Address register 131 is used to permit Interrupts and PIO Fills to bypass delayed Reads. As shown, the delayed read address may be temporarily stored in the register 131, thereby allowing a data path for the Interrupt and PIO Fill transactions to pass through multiplexer 137.

Accordingly, a method and apparatus is presented that allows for peer to peer read and write operations in a computer system without involving the central processing unit. By appropriate allocation of system memory space peer-to-peer operations can be accomodated without any extraneous decode steps. In addition, by enhancing the PCI bus protocol to allow the Host Bus Bridge to appropriately re-order transactions, peer-to-peer communication is facilitated without deadlock. The above mechanism for allows external devices coupled to different Host Bus Bridges to communicate without requiring any support from the Central Processing unit. In addition, the number of transactions that are transferred over the system bus are halved. Thus it can be seen that the above arrangment a provides large increases in computer performance.

INTERRUPT HANDLING

As mentioned previously, in prior art implementations of interrupt logic, valuable compute cycles are often wasted as the CPU gathers interrupt vector information for handling the interrupt.

According to the present invention, control over interrupt communication is transferred from the CPU to the external I/O devices. An interrupt data structure is stored in system memory. When the I/O interface detects an interrupt from one of its coupled devices, the interface issues a write operation to cause the contents of the data structure to be updated with the appropriate interrupt vector information. Accordingly, when the CPU becomes aware that an interrupt is pending, the vector information for generating the interrupt handler address is already stored in system memory and may be obtained via a simple memory read operation. As a result, multiple interrupts can be signalled without the need for I/O space read operations when handling interrupts.

Such an arrangement saves significant computer cycles that are used in the prior art gathering interrupt vector information. Because the I/O interface controls the transmission of the data to the interrupt data structure, it may place this data on the system bus whenever a bus cycle is available, rather than wait for the CPU to obtain the information when it has completed a code sequence.

In the preferred embodiment of the invention, any CPU may be the direct target of any interrupt. Individual interrupts may be disabled through the use of an interrupt mask register on the PCI bridge that is accessible by the CPU. In addition, there are no interrupt registers on the CPU or IO bridge cards themselves, rather each CPU updates its interrupt status by a direct write to the interrupt data structure stored in system memory.

Figure 12A:
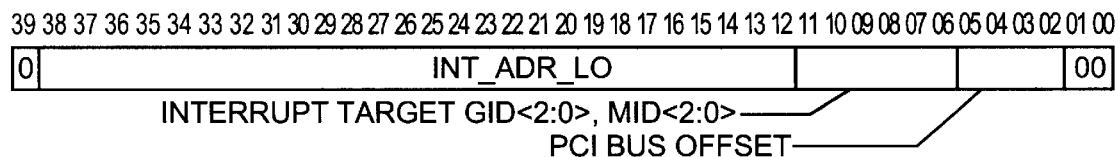
FIGS. 12a and 12b illustrate the address space allocation for an interrupt data structure stored in a system memory of a multi-processor computer system such as that shown in FIGS. 7 or 1.
Figure 12B:
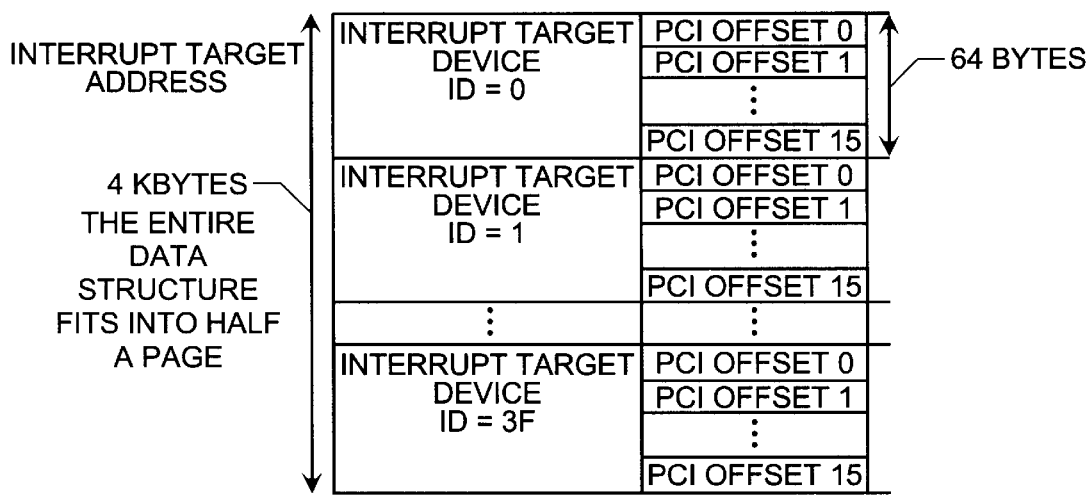

Referring now to FIGS. 12a and 12b, the address of the interrupt data structure is shown to comprise 40 bits. Bit 39 is set to a '0' to indicate system address space. Bits 38:12 specify the interrupt data structure base address. This field indicates where CPU daughter card specific interrupt information is stored. Bits 11:6 are used to identify the Module ID (MID) of the CPU that is the target of the interrupt, and the PCI bus offset field bits 5:2 is used to identify the PCI bus on which the interrupting I/O device is located.

Referring now to FIG. 12B, the address space of the interrupt data structure is shown to be apportioned into a plurality of sub-structures, one structure for each interrupt 'target' (for example, one for each CPU that may be interrupted by a PCI device). Here the entire data structure comprises 4 Kbytes of information. Associated with each target device sub-structure are a number of 4 byte locations that are used to store the interrupt data for each PCI bridge device. Each PCI bus has a four bit "PCI Offset" number assigned to it at system configuration time. This number is used to identify an entry within the interrupt target device sub-structure.

In general, interrupt vectors are assigned as shown in Table III below:

TABLE III

| OFFSET | Interrupting Device |
| --- | --- |
| 800 | All EISA device interrupts are offset from this vector |
| 900 | All PCI device interrupts are offset from this vector. The offset is: ((PCI Offset) * 200 + ((INT_REQ Bit Number + 2) * 10) |

Figure 13:
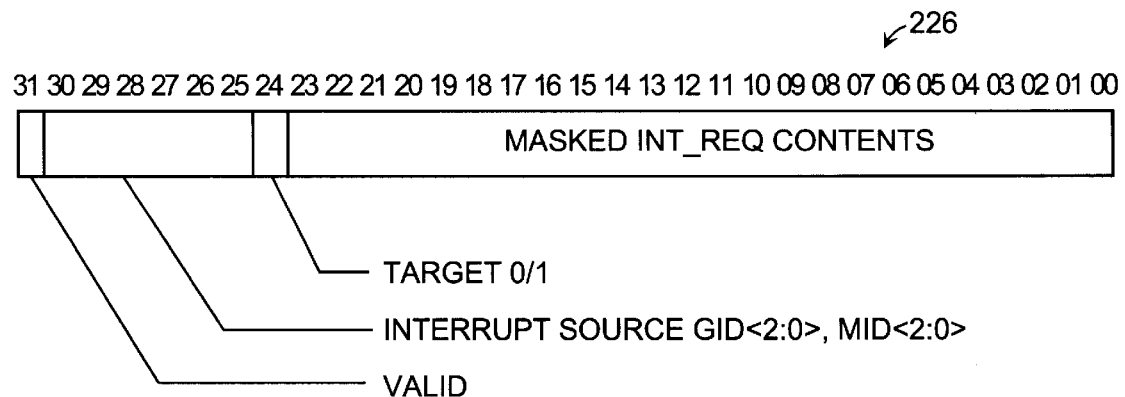
FIG. 13 illustrates one entry of the data structure allocated according to the address space considerations of FIG. 12.

Referring now to FIG. 13, an example entry of the interrupt data structure 226 is shown to include a VALID bit, Source indicator bits 30:25, a Target bit 24, and a masked interrupt register contents 23:0. The VALID bit is for indicating the validity of the interrupt data structure entry. The source indicator bits are for indicating the module ID of the source PCI bridge that issued the interrupt, for indicating where to send the acknowledgement when all interrupts have been serviced. The target bits are for which of the "N" possible interrupts to acknowledge. Note that here, only one target bit is shown. However, it should be understood that the field could be extended to support how ever many targets are desired for a given architecture. The 24 masked interrupt request bits are each associated with separate interrupt conditions.

Figure 14:
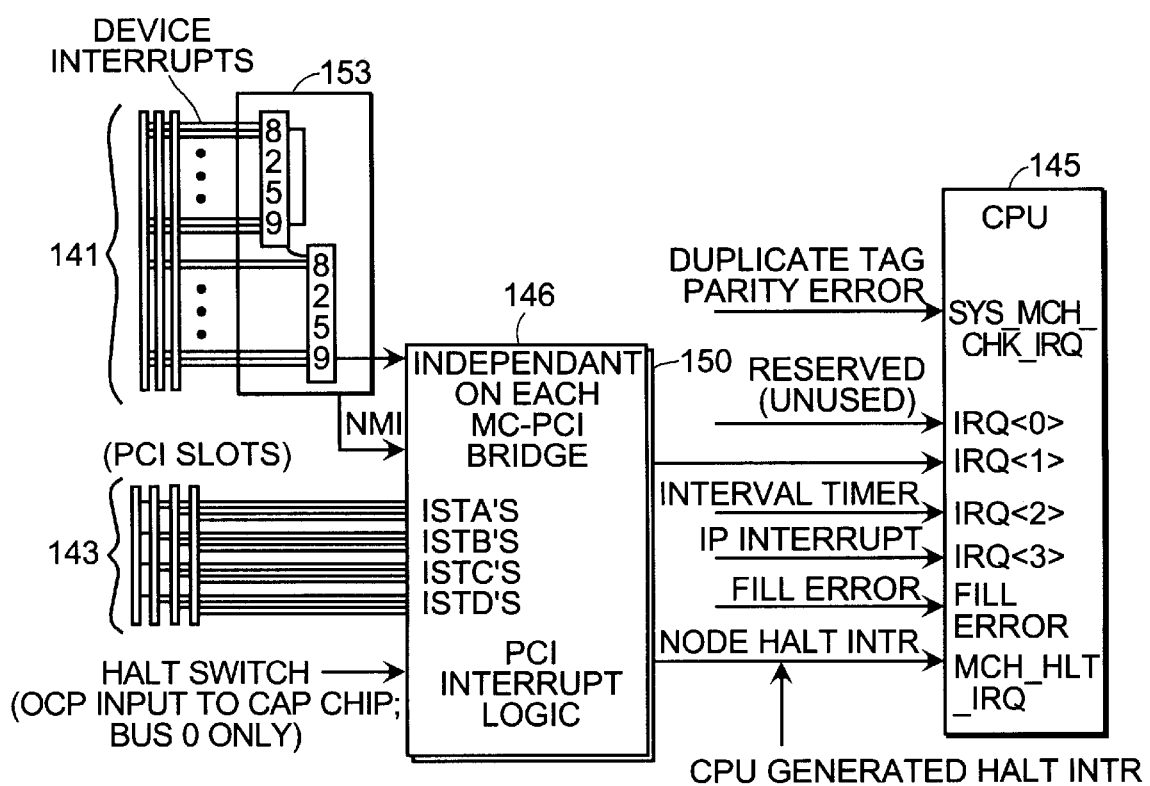
FIG. 14 is a high-level diagram for illustrating the interrupt mechanisms provided in the multiprocessor computer systems of FIG. 7 or FIG. 1.

Referring now to FIG. 14, a block diagram is provided for illustrating the source of interrupts in computer system 140. Eisa bridge unit 153 forwards all interrupts from the devices coupled to EISA slots 141 to PCI device 150 or 146 (depending upon the system construction). Each PCI bridge is receives one interrupt signal from each of its coupled devices over lines IntA–IntD. Each PCI bridge unit is logically coupled to drive the Interrupt Request (IRQ) bit <1> to the CPU. IRQ1 is asserted by counter which is incremented by PCI bridge write. The CPU 145 additionally receives interrupt signals Duplicate Tag Parity Error and Fill Error from on module cache logic. In addition the CPU receives interval timer interrupt, IP interrupt and a Node Halt Interrupt signal. These interrupt signals are prioritized, though the exact prioritization mechanism need not be described herein. Suffice it to say that some interrupt requests may be pending while higher priority events are serviced, and that pending interrupts have their IRQ signals asserted.

Figure 15:
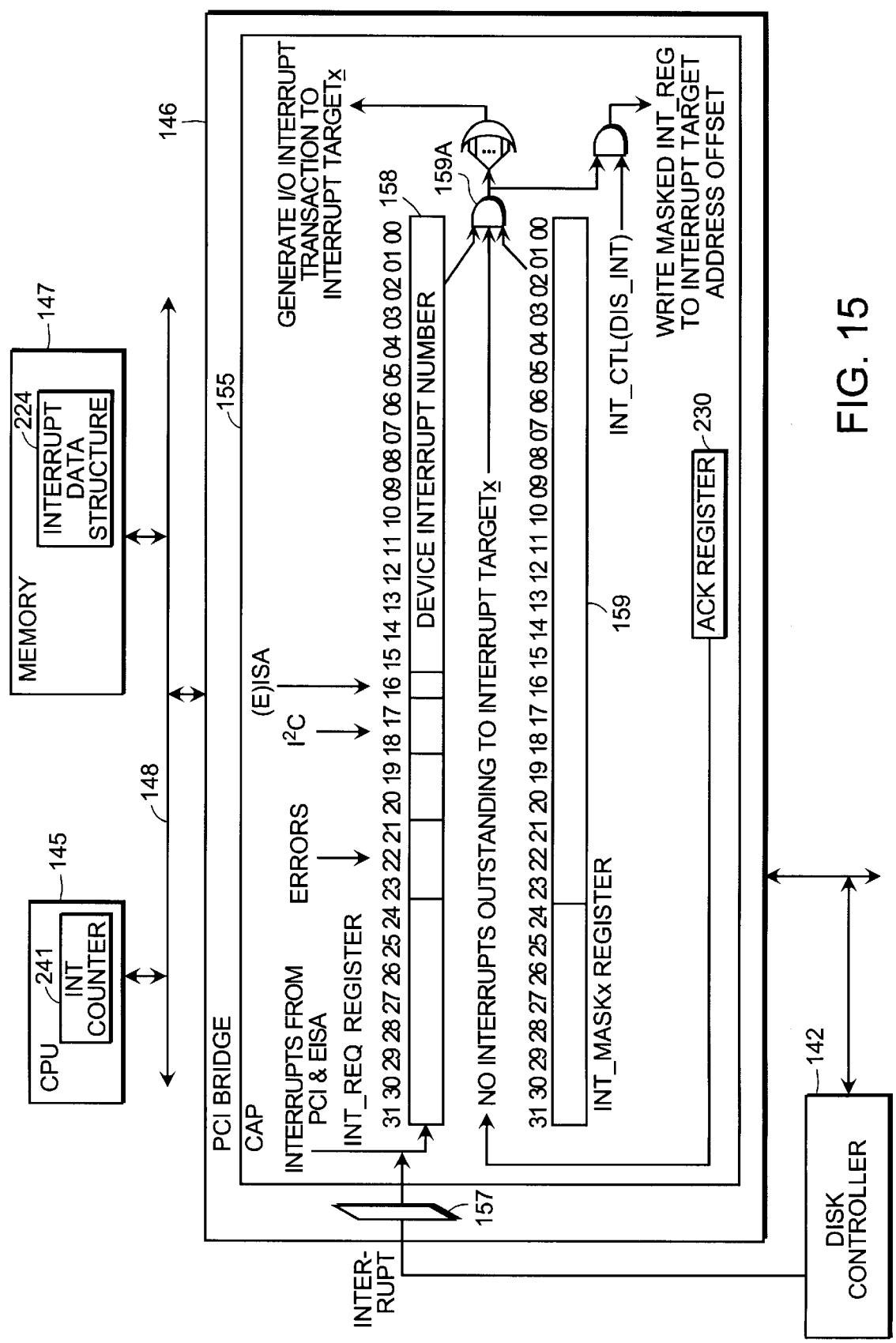
FIG. 15 is a block diagram of a portion of the multi-processor system of FIG. 7, including an exploded view of the logic in the Command and Address Path (CAP) unit of the PCI bridge.
Figure 16:
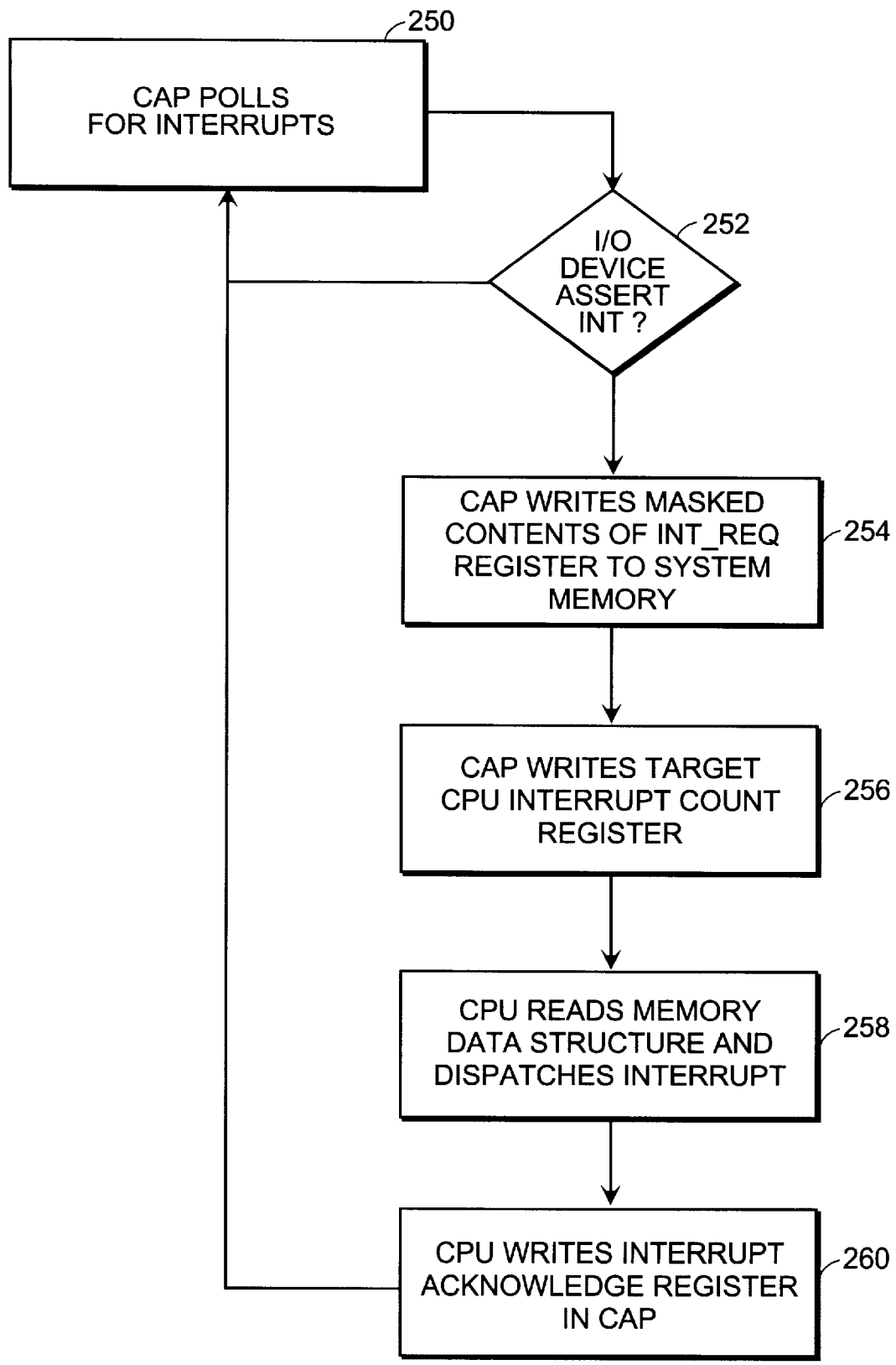
FIG. 16 is a flow diagram illustrating the process used for signalling interrupts to the central processing units in the multi-processor computer system of FIGS. 7 or 1.

Referring now to FIG. 15, a partial view of computer system 140 of FIG. 7 is provided with the memory 147 further shown to include an interrupt data structure 224. In addition, a portion of the CAP logic 155 that is used to control the communication of interrupt status between the Host Bus Bridge 146 and the central processor 145 is shown.

The operation undertaken by the computer system 140 for handling interrupts will now be described with reference to flow diagram 16.

Interrupts are captured in a shift register 158 on the MC-PCI bus bridge. At step 250, periodically (every ¼ to ½ micro-second), the logic in the CAP chip polls the contents of shift register 157. If at step 252 no interrupts are found, the CAP logic continues polling at step 250. If, however, any interrupts are found, they are loaded into the Interrupt Request register 158. Once an interrupt is canned into the Interrupt Request register, it remains there until it is cleared by software.

The software enables interrupts by loading of two or more Interrupt Mask registers in the CAP chip with bits set for those interrupts that it wants enabled. One register 159 enables those interrupts that are to target a first CPU, and the other register (not shown) enables those interrupts that are to target a second CPU. The second etc register is substantially identical to register 159 and therefore will not be described in further detail. In addition, it should be noted that although only one register will be described, it is envisioned that the invention may be extended to provide a flexible number of mask registers in accordance with the number of interruptable CPUs in the system. Therefore the invention should not be limited to one or two registers for controlling central processors.

The contents of the Interrupt Request register 158 are ANDed together with the contents of the Interrupt Mask register 159 via and gate 159a. If there are any enabled interrupts, the CAP chip posts the interrupts that it has found at step 254 by performing a Read Modify Write of the contents of the Interrupt Request Register 158 to the interrupt data structure 224 is system memory 147.

After writing the Interrupt Request Register to system memory, at step 256 the CAP chip in the PCI Bridge chip issues a write to increment an interrupt counter 241 in the target CPU chip. The counter indicates to the CPU the number of interrupts that are currently outstanding. The output of the counter causes the IRQ<1>bit to be asserted to the CPU. If the counter is non-zero, and interrupts are enabled, then at step 258 the processing of the CPU will be interrupted.

When the CPU is interrupted, a software routine is invoked to handle the interrupt. The software routine, at step 258, scans the Interrupt Data Structure in memory. When it finds an entry with its valid bit set, the routine will scan the masked interrupt request field of the data structure entry. The location of the first interrupt bit that is set is combined with the PCI offset of the interrupting device to calculate an interrupt vector that is used to dispatch an interrupt service routine for the device that generated the interrupt. Once the interrupt vector is calculated, that interrupt request bit used to calculate the interrupt vector will be cleared. (Thus, during the next scan of the interrupt request field, the next sequential bit that is set will again trigger the creation of an interrupt vector for accessing an interrupt service routine).

At the end of the interrupt service routine, the CPU executes a Return from Exception or Interrupt (REI) instruction. This will cause the CPU to immediately return to the interrupt software routine, because the IRQ counter has not been decremented. Alternatively, the interrupt service routine may return directly to the software routine. The software routine will then start to scan the interrupt data structure looking for interrupts that need to be processed. If no new interrupts have occurred since the last scan of the data structure, the software routine returns to the entry that was just serviced, since it's valid bit is still set.

If the software routine encounters another bit set in that entry, it will again calculate the related interrupt vector and invoke the service routine. This process continues until none of the valid entries in the data structure have bits set in their interrupt request field. When the software routine encounters a valid entry with no bits set it clears the valid bit for the entry. The CPU then, at step 260 writes an acknowledge register in the CAP unit corresponding to the data structure entry to indicate that all of the pending interrupts for that bridge device have been serviced. There are multiple acknowledge registers in the CAP unit; one for each of the target CPUs that service the interrupts from the bridge unit. The address of the acknowledge register is calculated from the MID field of the address of the data structure entry and the target field of the data structure entry.

When the write to the acknowledge register occurs over the system bus 30 the CPU decrements its pending interrupt counter.

If, after the counter is decremented, the interrupt counter is zero, the CPU will resume application execution. It is possible that interrupts could have recorded in the interrupt data structure during the period of time between when the CPU writes the acknowledge register and when the counter is decremented. Therefore, if the counter is non-zero after it is decremented, then the software routine will again be invoked to determine which bits were set in the data structure.

The above arrangement improves performance by decreasing the time required for a CPU to respond to an interrupt condition. Because the interrupt status is stored in system memory, the need for I/O reads to obtain the interrupt vector is eliminated. In addition, the use of a data structure allows for the I/O device to signal multiple interrupts at one time from one or more PCI bridge units. Also, the addressing mechanism used for allocating the interrupt data structure allows for interrupts to be directed at a specific processor.

Accordingly, a multi-processor system has been described with a number of method of improving system performance through efficient use of system bus resources. By expanding aspects of cache coherent logic into non-cacheable device interface protocol, performance may be almost doubled for partial cache line write operations by non-cacheable devices. In addition, by providing an improved bus protocol capable of taking advantage of certain aspects of the system and I/O address allocation, peer-to-peer DMA access can be accommodated with reduced system bus utilization. Also interrupt handling is improved by transferring control of the interrupt notification from the interrupted device to external devices.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

What we claim is:

1. A method for providing communication between a first external device coupled to a first external bus and a second external device coupled to a second external bus, said first external bus coupled to a multiprocessor computer system bus via a first bridge device, said second external bus coupled to said multi-processor system bus via a second bridge device, said method comprising the steps of:

said first external device issuing a first access request associated with a portion of a memory space of said multi-processor computer system to said first bridge device, said portion of said memory space allocated to accesses for said second external device, said first access request including a first address of said portion of said memory space;

said first bridge device remapping said first address to a second address before issuing a second access request, the second access request being on said computer system bus; and said second bridge device detecting said access request on said bus as an access request for said second external device, said second bridge device mapping said second address to said first address, and forwarding said request to said second external device.

2. The method according to claim 1 wherein said access request is a direct access request to an address space of said memory space.

3. The method according to claim 1, wherein said first and second bridge devices each include at least two queues, for queuing input and output data, respectively, and wherein said method further comprises the step of reordering commands stored in said queues for prevention of deadlock.

4. The method according to claim 3, wherein said step of reordering commands includes the steps of allowing a subset of write operations received from said system bus to bypass a subset of read operations received from said system bus.

5. The method according to claim 3, wherein said step of reordering commands includes the steps of allowing DMA read return data to bypass posted data from a write initiated on said system bus.

6. A method of providing a communication link between at least two I/O devices coupled to different I/O busses via at least two corresponding I/O bridges, each of the I/O bridges coupled to communicate over a system bus, wherein a plurality of other devices are also coupled to said system bus, and wherein each of said devices coupled to said bus has associated therewith an identification value, said method comprising the steps of:

issuing, by a first one of said I/O devices, a first access request to said corresponding I/O bridge device, said corresponding I/O bridge device issuing a second access request, said second access request being over said system bus to a second one of said I/O devices, said second access request identifying said second one of said I/O devices via an address incorporating said identification value of said device;

identifying, at the corresponding bridge device of said second I/O device, said access request as an access request for said second I/O device; and said second I/O bridge formatting said second access request and forwarding said formatted access request to said second I/O device without intervention from other devices coupled to said system bus.

7. The method according to claim 6, wherein said access request is a command indicating that a transfer is to be made between external devices coupled to different I/O busses deadlock avoidance to.

8. A multi-processor computer system comprising:

a plurality of processors coupled via a system bus;

at least two bridge devices, coupled to said system bus, each of said bridge devices for communicating with a corresponding external bus, and each respective external bus for coupling a different plurality of devices to an associated one of said at least two bridge devices; and means for transferring data from a first external device coupled to a first one of said respective external busses to a second external device couple to a second one of said respective external busses without intervention by said plurality of processors, wherein said means for transferring data further comprises:

a memory address space, said memory address space apportioned into a plurality of subsets, where each one of a group of said plurality of subsets of memory address space corresponds to memory at one of said external devices; and each of said bridge devices further comprising:

means for translating a transaction request received from external devices coupled to said bridge into said memory space addresses of said corresponding external device;

means for monitoring said system bus to detect transactions issued on said system bus at memory space addresses corresponding to the memory space addresses of the external devices coupled to said bridge.

9. The apparatus of claim 8, wherein each of said bridge devices further comprises:
   a first queue for storing transactions to be forwarded from said external devices coupled to said bridge device to said system bus;
   a second queue for storing transactions to be forwarded from said system bus to said external devices coupled to said bridge;
   wherein each of said first and second queues are first in first out design queues; and
   each queue comprising control means for re-ordering the transactions in said queue to preclude deadlock at said associated bridge.

10. The apparatus of claim 9, wherein said control means of said first queue further comprises means for allowing a subset of write transactions to bypass a subset of read transactions.

11. The apparatus of claim 9, wherein said control means of said second queue further comprises means for allowing a subset of read return transactions to bypass a subset of write transactions.

12. A method for providing communication between a first external device coupled to a first external bus and a second external device coupled to a second external bus, said first external bus coupled to a multi-processor computer system via a first bridge device, said second external bus coupled to said multi-processor system via a second bridge device, said method comprising the steps of:
   said first external device issuing an access request to a portion of a memory space of said multi-processor computer system, said portion of said memory space allocated to accesses for said second external device; and
   said second bridge device detecting said access request on said bus as an access request for said second external device, and forwarding said request to said second external device, wherein said first and second bride devices each include at least two queues, for queuing input and output data, respectively; and
   reordering commands stored in said queues for prevention of deadlock, wherein said step of reordering commands includes the steps of allowing a subset for write operations received from said system bus to bypass a subset of read operations received from said system bus.

13. A method for providing communication between a first external device coupled to a first external bus and a second external device coupled to a second external bus, said first external bus coupled to a multi-processor computer system via a first bridge device, said second external bus coupled to said multi-processor system via a second bridge device, said method comprising the steps of:
   said first external device issuing an access request to a portion of a memory space of said multi-processor computer system, said portion of said memory space allocated to accesses for said second external device; and
   said second bridge device detecting said access request on said bus as an access request for said second external device, and forwarding said request to said second external device, wherein said first and second bride devices each include at least two queues, for queuing input and output data, respectively; and
   reordering commands stored in said queues for prevention of deadlock, wherein said step of reordering commands includes the steps of allowing DMA read return data to bypass posted data from a write initiated on said system bus.

14. A multi-processor computer system comprising:
   a plurality of processors coupled together via a system bus;
   at least two bridge devices, coupled to said system bus, each of said bridge devices for communicating with a corresponding external bus, and each respective external bus for coupling a different plurality of devices to said associated bridge device; and
   means for transferring data from a first external device coupled to a first one of said respective external busses to a second external device coupled to a second one of said respective external busses without intervention by said plurality of processors;
   each of said bridge devices further comprising:
      a first queue for storing transactions to be forearded from said external devices coupled to said bridge device to said system bus;
      a second queue for storing transactions to be forearded from said system bus to said external devices coupled to said bridge; wherein each of said first and second queues are first in first out design queues; and
      each queue comprising control means for re-ordering the transactions in said queue to precluded deadlock at said associated bridge, and wherein said control means of said first queue further comprises means for allowing a subset of write transactions to bypass a subset of read transactions.

15. A multi-processor computer system comprising:
   a plurality of processors coupled together via a system bus;
   at least two bridge devices, coupled to said system bus, each of said bridge devices for communicating with a corresponding external bus, and each respective external bus for coupling a different plurality of devices to said associated bridge device; and
   means for transferring data from a first external device coupled to a first one of said respective external busses to a second external device coupled to a second one of said respective external busses without intervention by said plurality of processors; wherein each of said bridge devices further comprises:
      a first queue for storing transactions to be forearded from said external devices coupled to said bridge device to said system bus;
      a second queue for storing transactions to be forearded from said system bus to said external devices coupled to said bridge;
      wherein each of said first and second queues are first in first out design queues; and
      each queue comprising control means for re-ordering the transactions in said queue to precluded deadlock at said associated bridge, wherein said control means of said second queue further comprises means for allowing a subset of read return transactions to bypass a subset of write transactions.

* * * * *